(12) United States Patent
Gibbons et al.

(10) Patent No.: US 11,741,197 B1
(45) Date of Patent: Aug. 29, 2023

(54) OBFUSCATING PROGRAMS USING DIFFERENT INSTRUCTION SET ARCHITECTURES

(71) Applicant: Shape Security, Inc., Santa Clara, CA (US)

(72) Inventors: Kevin Gibbons, Stanford, CA (US); Michael J. Ficarra, Sunnyvale, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 0 days.

(21) Appl. No.: 17/066,962

(22) Filed: Oct. 9, 2020

Related U.S. Application Data

(60) Provisional application No. 62/915,183, filed on Oct. 15, 2019.

(51) Int. Cl.
*G06F 21/14* (2013.01)
(52) U.S. Cl.
CPC .................. *G06F 21/14* (2013.01)
(58) Field of Classification Search
CPC ...... G06F 21/14; G06F 21/53; G06F 9/45529; G06F 9/30021; G06F 9/45504; G06F 9/4552; G06F 9/455; H04L 63/1416; H04L 2463/144; H04W 12/71
See application file for complete search history.

(56) References Cited

U.S. PATENT DOCUMENTS

| | | | |
|---|---|---|---|
| 6,139,199 A | 10/2000 | Rodriguez | |
| 6,151,618 A | 11/2000 | Wahbe | |
| 6,668,325 B1 | 12/2003 | Collberg et al. | |
| 7,254,586 B2 | 8/2007 | Chen et al. | |
| 7,263,722 B1 | 8/2007 | Luo et al. | |

(Continued)

FOREIGN PATENT DOCUMENTS

| | | |
|---|---|---|
| CN | 110555291 A | 12/2019 |
| WO | WO2013091709 A1 | 6/2013 |
| WO | WO2017007936 A1 | 1/2017 |

OTHER PUBLICATIONS

Currie, M. W. et al., "In the Wire Authentication: Protecting client-side critical data fields in secure network transactions", IEEE, pp. 232-237, Jan. 14, 2009.

(Continued)

*Primary Examiner* — Brian F Shaw
(74) *Attorney, Agent, or Firm* — Troutman Pepper Hamilton Sanders LLP (F5 In-House)

(57) ABSTRACT

Technology related to obfuscating programs using different instruction set architectures is disclosed. In one example, a method includes receiving a program implemented as a set of ordered instructions. Each instruction of the set of ordered instructions has a type specified by a first instruction set architecture (ISA). A subgroup of instructions is selected from the set of ordered instructions. A new instruction type is generated to perform the operations of the subgroup of consecutive instructions. The new instruction type is added to a second ISA. An updated program is generated by replacing the subgroup of instructions with a new instruction of the generated new instruction type. An interpreter for executing programs using the second ISA is generated. In response to a request for the program, the updated program and the interpreter is sent.

16 Claims, 10 Drawing Sheets

(56) References Cited

U.S. PATENT DOCUMENTS

| | | |
|---|---|---|
| 7,421,586 B2 | 9/2008 | Luo et al. |
| 7,620,987 B2 | 11/2009 | Shelest et al. |
| 7,730,542 B2 | 6/2010 | Cronce et al. |
| 7,770,106 B2 | 8/2010 | Waldman et al. |
| 7,975,308 B1 | 7/2011 | Satish et al. |
| 8,392,910 B1 | 3/2013 | Asher |
| 8,424,090 B2 | 4/2013 | Kang et al. |
| 8,510,571 B1 | 8/2013 | Chang et al. |
| 8,661,549 B2 | 2/2014 | Chevallier-Mames et al. |
| 8,806,187 B1 | 8/2014 | Vemula et al. |
| 8,806,627 B1 | 8/2014 | Aharoni et al. |
| 9,241,004 B1 | 1/2016 | April |
| 9,294,502 B1 | 3/2016 | Benishti |
| 9,501,301 B2 | 11/2016 | Teuwen |
| 9,582,666 B1 | 2/2017 | Overson et al. |
| 9,602,543 B2 | 3/2017 | Hidayat |
| 9,807,113 B2 | 10/2017 | Yang et al. |
| 9,887,969 B1 | 2/2018 | Shemesh et al. |
| 10,027,628 B2 | 7/2018 | Call |
| 10,216,488 B1 | 2/2019 | Overson et al. |
| 10,382,482 B2 | 8/2019 | Yang et al. |
| 2002/0099827 A1 | 7/2002 | Shah et al. |
| 2003/0023960 A1 | 1/2003 | Khan |
| 2004/0010714 A1 | 1/2004 | Stewart |
| 2004/0162994 A1 | 8/2004 | Cohen et al. |
| 2005/0132068 A1 | 6/2005 | Rajamony |
| 2005/0183072 A1 | 8/2005 | Horning et al. |
| 2006/0195703 A1 | 8/2006 | Jakubowski |
| 2006/0253687 A1 | 11/2006 | Jakubowski et al. |
| 2007/0234070 A1 | 10/2007 | Horning et al. |
| 2008/0183902 A1 | 7/2008 | Cooper et al. |
| 2008/0222736 A1 | 9/2008 | Boodaei et al. |
| 2009/0077383 A1 | 3/2009 | de Monseignat et al. |
| 2009/0119515 A1 | 5/2009 | Nicolson et al. |
| 2009/0144829 A1 | 6/2009 | Grigsby et al. |
| 2009/0193513 A1 | 7/2009 | Agarwal et al. |
| 2009/0235089 A1 | 9/2009 | Ciet et al. |
| 2010/0005527 A1 | 1/2010 | Jeon |
| 2010/0257354 A1 | 10/2010 | Johnston et al. |
| 2010/0281459 A1 | 11/2010 | Betouin et al. |
| 2011/0035733 A1 | 2/2011 | Horning et al. |
| 2011/0107077 A1 | 5/2011 | Henderson et al. |
| 2011/0131416 A1 | 6/2011 | Schneider |
| 2011/0138373 A1 | 6/2011 | Lane et al. |
| 2011/0239113 A1 | 9/2011 | Hung et al. |
| 2011/0307954 A1 | 12/2011 | Melnik et al. |
| 2012/0022942 A1 | 1/2012 | Holloway |
| 2012/0124372 A1 | 5/2012 | Dilley et al. |
| 2012/0159193 A1 | 6/2012 | Spradlin et al. |
| 2013/0067225 A1 | 3/2013 | Shochet et al. |
| 2013/0152071 A1 | 6/2013 | Asher |
| 2014/0165197 A1 | 6/2014 | Ur et al. |
| 2014/0223290 A1 | 8/2014 | Hathaway |
| 2015/0039962 A1 | 2/2015 | Fonseka et al. |
| 2015/0096006 A1 | 4/2015 | Chu et al. |
| 2015/0278491 A1 | 10/2015 | Horning et al. |
| 2016/0359901 A1 | 12/2016 | Yang |
| 2017/0012960 A1 | 1/2017 | Idika |
| 2017/0024230 A1 | 1/2017 | Li et al. |
| 2017/0041341 A1 | 2/2017 | Wang et al. |
| 2017/0213027 A1* | 7/2017 | Gu ................. G06F 21/556 |
| 2017/0264623 A1 | 9/2017 | Ficarra |
| 2018/0077160 A1 | 3/2018 | Call |
| 2018/0121680 A1 | 5/2018 | Wang |
| 2018/0159830 A1 | 6/2018 | Gibbons |
| 2019/0243951 A1 | 8/2019 | Hansen |
| 2019/0245833 A1 | 8/2019 | Overson |

OTHER PUBLICATIONS

International Search Report for PCT/US16/41337, dated Oct. 11, 2016.

International Search Report for PCT/US17/21409, dated May 23, 2017.

European Search Report for EP Application No. 17764019.0, dated Feb. 4, 2020.

* cited by examiner

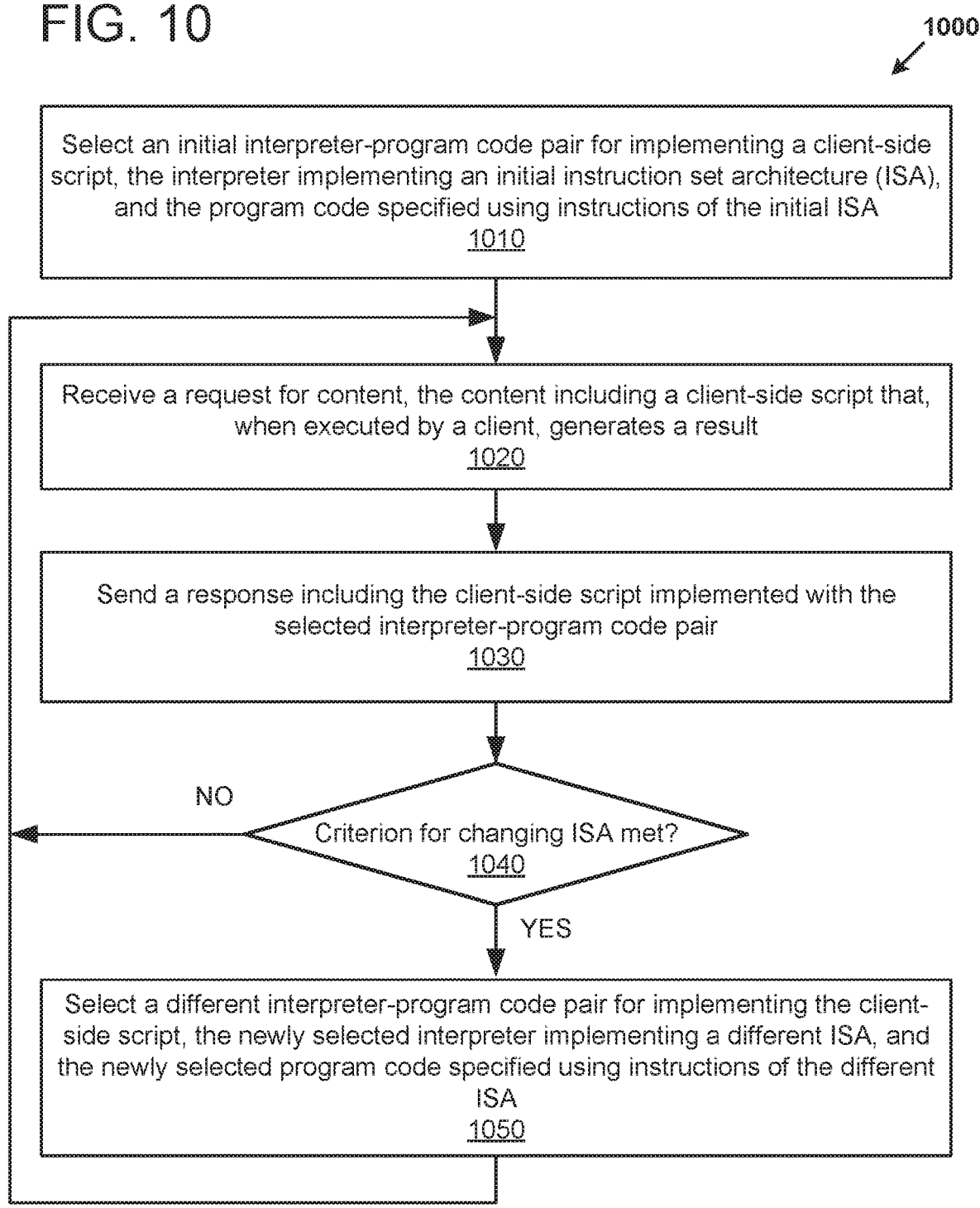

OBFUSCATING PROGRAMS USING DIFFERENT INSTRUCTION SET ARCHITECTURES

CROSS REFERENCE TO RELATED APPLICATION

This application claims the benefit of U.S. Provisional Patent Application Ser. No. 62/915,183 filed Oct. 15, 2019, which is hereby incorporated by reference in its entirety.

FIELD

The present disclosure generally relates to client-server computing systems, and relates more specifically to techniques for obfuscating client-side scripts that execute on a client computer.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. Responding to the requests can include retrieving data and/or executing a task at the application server and/or providing a client-side script to be executed on the client device. A client-side script can be used to reduce a processing load at the application server and may provide a more responsive user experience by reducing and/or eliminating round-trip travel time of network communications between the client and the server for some operations. However, client-side scripts may provide information that can be exploited by attackers when attacking the application server. There can be many challenges in implementing client-side scripts that maintain a high performance, highly available, and secure client-server architecture when the client-side scripts are likely to be exposed to attackers.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network computer system comprising one or more intermediary computers or server computers, the method including: receiving a program implemented as a set of ordered instructions. Each instruction of the set of ordered instructions has a type specified by a first instruction set architecture (ISA). A subgroup of consecutive instructions is selected from the set of ordered instructions. A new instruction type is generated, where the new instruction type performs the operations of the subgroup of consecutive instructions. The new instruction type is added to a second ISA. An updated program is generated by replacing the subgroup of consecutive instructions with a new instruction of the generated new instruction type. A set of interpreter instructions is generated that implements an interpreter to execute programs that are specified using instruction types specified by the second ISA. In response to a request for the program, the updated program and the set of interpreter instructions implementing the interpreter to execute programs that are specified using instruction types specified by the second ISA is sent.

Other embodiments incorporating this example include corresponding computer systems, apparatus, and computer programs recorded on one or more non-transitory computer readable media (e.g., computer storage devices), each configured to perform the actions of the methods. An example computer system includes one or more network computer modules, networking modules, or server modules, memory comprising programmed instructions stored thereon, and one or more processors configured to be capable of executing the stored programmed instructions to perform the actions of the methods. An example non-transitory computer readable medium having stored thereon instructions for obfuscating programs using different instruction set architectures, the instructions comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

BRIEF DESCRIPTION OF THE DRAWINGS

FIG. 10 is a flowchart of an example method for servicing client requests for a program, where the program is obfuscated by using different instruction set architectures for the program.

DETAILED DESCRIPTION

Introduction

Figure 1:
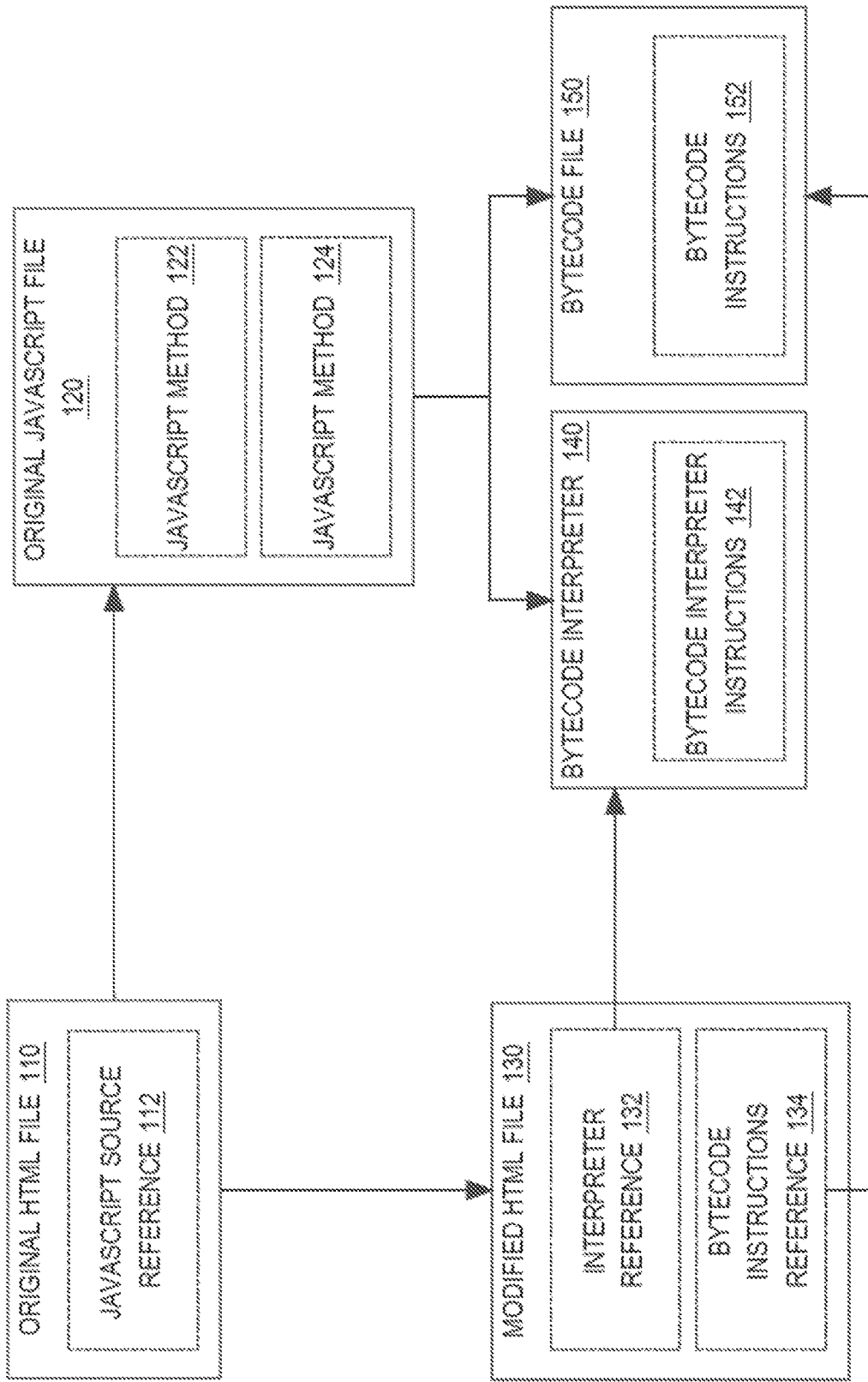
FIG. 1 illustrates an example of an updated program and an interpreter generated from an original program, according to one or more techniques for obfuscating a program using different instruction set architectures.

A software application (such as a web application or a network application) can be implemented on a client-server architecture. For example, the client-server architecture can include a client device that presents a user-interface to a user of the client device for receiving input from the user and for presenting output to the user. The client device can communicate with a server device that can perform a variety of functions such as controlling access to the software application and producing and delivering content (such as a web page) to the user.

As one example, the client device can execute a browser application (also referred to as a web browser or a browser) for communicating with the server device via a public or private network (e.g., the Internet). Browsers are computer program applications that may request content from server computers (e.g., a web server). The content can include data and programs, such as client-side scripts that are executed in conjunction with the browser on the client device. As one example, a client-side script can include instructions that, when executed by the client device, are used to generate a user interface that presents to a user through one or more components, such as a monitor or speakers. In response to input from a user, such as a mouse click indicating that the user selected an object defined in the instructions, such as a link, a browser may send a request based on the selected object to the server computer. The request may be a request for data and/or include data to be processed by the server computer. In response to the client request, the server computer can respond with content that matches the client request.

The content requested by the client device and sent by the server computer can include different types of data and be formatted in various ways. For example, the content can include programs, objects, metadata, and other data that are stored in one or more files and that can be used to generate a page (e.g., a web page) that can be displayed by the browser on the client device. As one example, the content can include a program including a set of instructions that define one or more objects with one or more object identifiers. The instructions may use the object identifiers to define how objects may be presented in a UI to enable human/computer interaction. A set of instructions, file, and/or web page need not have a particular type or file extension, and need not be stored in persistent storage on the client or server. For example, a web page may be generated dynamically by the server based on one or more parameters. While some files may be identified as a particular type of file, such as an "HTML file" or "JavaScript file," a file may include mixed content. For example, an HTML file may include HTML, JavaScript, Cascading Style Sheets ("CSS"), and/or any other standard and/or proprietary set of instructions. Furthermore, a file need not be stored in persistent storage. For example, a file can be stored in volatile random-access memory (RAM). It should be noted that while some of the instructions in some of the examples discussed herein are HyperText Markup Language ("HTML") and JavaScript instructions, in other examples, the original instructions and generated instructions may be any other standard and/or proprietary instructions configured to be executed by a client computer.

The content can include confidential data (such as account numbers and/or balances) and/or data that may have commercial value. Accordingly, the content can be restricted to users authorized to use the server application and/or to view the content. Malicious users (e.g., attackers) can attack a server computer in an attempt to obtain confidential information, corrupt the integrity of data stored on the server computer, and/or make the server computer unavailable to authorized users. For example, the attackers may attempt to commit many types of unauthorized acts, crimes, or computer fraud, such as content scraping, ratings manipulation, fake account creation, reserving rival goods attacks, ballot stuffing attacks, password snooping, web site scraping attacks, vulnerability assessments, and stack fingerprinting attacks.

One technique that attackers can use to attack a server computer is to use one or more "bot" programs (also referred to as bots, robots, web robots, and internet bots) to interact with the server computer. A bot program is an automated software application that can perform predefined tasks in a networked environment (such as the Internet). Attackers can distribute large numbers of bots by embedding them in malware and viruses that can be installed and executed on unknowing user's computers. The group of bots (also referred to as a botnet) can be coordinated to distribute an attack across many computers making it more difficult to counteract the attack. An individual bot can imitate a browser by performing at least some of the functions of a browser, such as receiving content from a web server and generating requests based on the received content. For example, a bot may receive a web page, gather data in one or more objects defined in the web page, and generate a request for another web page to gather additional data, as if a user using a browser was requesting a new web page. As another example, a bot can generate and send a request with data assigned to one or more parameters to simulate a user submitting data to a web server through a browser. As another example, a malicious user may cause a bot to traverse through pages of a web site and collect private and/or proprietary data, such as who is connected with whom on a particular social network site.

In contrast to a web browser, bots can traverse web pages and/or web sites to retrieve data from, and/or submit data to, one or more web servers with little, if any, human/computer interaction. For example, in response to receiving a request for data from a bot, a web server may respond with a set of instructions. A bot may parse the instructions to collect data from, and/or to store data in, particular objects with particular object identifiers. A bot may also make requests based on an object identifier, such as the identifier for a text field input. However, unlike a browser, a bot need not execute the instructions that define how objects should be presented in a UI because the bot is built to operate with little, if any, human/computer interaction. Thus, a bot may be a functionally-limited browser. For example, a browser may include a JavaScript runtime environment, which executes JavaScript instructions that define how one or more objects are presented to a user. However, a bot might not include a JavaScript runtime environment because a bot does not need to present objects to a user.

An attacker may use object identifiers in various attacks, such as a man-in-the-browser attack. In a man-in-the-browser attack, malicious code may be injected in a web browser, which when executed may gather data that is entered by a user into particular fields with particular identifiers before the data is encrypted and sent to the intended recipient. For example, a user may enter account information into a web browser that is displaying a web page from the user's bank. The web page may be a login page to access the user's account information and funds. The malicious code may scan particular fields with particular identifiers in the web page to collect the user's account information before the user's account information is encrypted and sent to the user's bank. The malicious code may send the collected data from those fields to the attacker's computer.

A content provider may wish to protect the data and server computers hosting the content from malicious users (e.g., bots) while allowing legitimate users to use the site as intended. One way that the content provider can distinguish between a legitimate user using a web browser and a malicious user using a bot is to add challenges and/or analysis tools to pages that are stored on and sent from the server computers. One type of challenge is a completely automated public Turing test (captcha). As one example, a captcha can present a somewhat obscured phrase to a user interface and, if the user can decipher and enter the phrase as an input to the user interface, the user can be assumed to be a legitimate human user. As another example, analysis tools can capture how data is entered into a user interface (e.g., a rate of data entry, a movement of a mouse cursor, and so forth) and compare the captured information about the data entry to how a legitimate human user is expected to enter the data.

The challenges and/or analysis scripts can be implemented as client-side scripts that execute on the client device. One potential downside to performing the challenge and/or analysis on the client device, is that a malicious user can observe and analyze programs (e.g., client-side scripts) that execute on the client device. Standard programming languages for the web, such as Javascript, can specify programs using human-readable instructions. Programs specified using human-readable instructions can be easier to interpret than programs that use a higher level of encoding, such as object code or machine code. Accordingly, one approach to computer security can include obfuscating programs contained in web pages by transforming human-readable code within the web page, such as JavaScript, into non-human-readable code, such as machine code. This approach may prevent or make it more difficult for malicious users to review the code or use an automated tool to analyze the code and determine the intended functionality of various fields and functions. However, a malicious user may still monitor execution of the code and analyze how the code executes under different inputs to determine the intended functionality of the machine code. Accordingly, multiple levels of obfuscation may be helpful for disguising the operation of client-side scripts.

Machine code is executable software code that uses machine instructions that directly control computer hardware of a machine (e.g., a processor). A machine instruction is encoded as a number of bits that can include an opcode and optional arguments. The opcode can specify the operation of the machine instruction and the arguments specify values and/or references to be used during the operation. For example, a two-input add operation can be specified with an opcode such as 01000010 or 42 in hexadecimal. The argument of the add instruction (e.g., the numbers to be added, the location to get the numbers to add, and/or a location to store the result of the add) can be implicit or explicit. As one example, an add instruction can use implicit arguments where the numbers to add are always pulled from a stack memory and the result is always pushed back on the stack. As another example, the arguments can be encoded in the machine instruction so that different locations for the inputs and outputs of the instruction can be specified by the encoding of the instruction.

Virtual machines are emulated computer hardware that can provide virtual storage, computation, networking, and memory resources. For example, a software interpreter can be configured to emulate a particular virtual machine and to execute programs that use instructions of the virtual machine. Virtual machines can execute on different physical hardware configurations and/or different host operating systems while the emulated computer system provides the same interface to software applications executing on the emulated computer system. Virtual machines can potentially be helpful where a software application may be executed on many different types of physical computer hardware configurations, such as for web applications where the different clients accessing the content on a web server may have many different hardware configurations.

Virtual machines can be configured to execute bytecode. Bytecode is a set of one or more instructions that are executed by a virtual machine. Similar to machine code, bytecode can use encodings that are more difficult for a human to read and analyze than human-readable source code, such as HTML or JavaScript. In contrast, human-readable code is generally designed for programmers to be able to readily read, analyze, and/or modify the code. Bytecode can include numeric codes, constants, and references that may encode the result of parsing, compiling, or transpiring one or more sets of human-readable source code. Although human-readable source code may be represented by at least one series of bytecode, not all bytecode directly represents human-readable source code. Thus, one technique for obfuscating source code can include compiling source code into bytecode since it can potentially be difficult to decompile bytecode in order to produce human-readable source code. Additional techniques, such as performing transformations on blocks of bytecodes, can further obfuscate the source code.

Bytecode conversion can be used to prevent, slow, and/or deter attacks. For example, human-readable JavaScript in a web page may define an original method, which when executed, submits a request to a server computer with data that includes a security token that the server computer may use to validate the request. An attacker may review the human-readable JavaScript, determine what the security token is, or how the original method generates the security token. The attacker may use that knowledge to send one or more requests with purposefully incorrect or false data and a valid security token to the server computer. Additionally or alternatively, the attacker may create a new function that generates a valid security token according to the algorithm defined in the original method and sends a request with purposefully incorrect or false data and the valid security token to the server computer.

Converting human-readable code or instructions into less human-readable bytecode, before the human-readable code is sent to a client computer, may slow or prevent attackers from reviewing the human-readable code to determine functionality defined by the code. Representing a program as bytecodes can obscure the behavior of the program. Human-readable source code may be represented by at least one series of bytecodes, but one or more series of bytecodes need not directly represent some human-readable source code. Accordingly, the process of "decompiling" a series of bytecodes, to produce equivalent human-readable source, can be difficult, especially if the original compiler is designed to make de-compilation difficult. Thus, attackers may be slowed or prevented from exploiting or simulating the functionality defined by the human-readable code, and thus, attackers may be slowed or prevented from performing one or more various attacks, such as a denial of service ("DOS") attack, credential stuffing, fake account creation, ratings or results manipulation, man-in-the-browser attacks, reserving rival goods or services, scanning for vulnerabilities, and/or exploitation of vulnerabilities.

However, sophisticated malicious users may eventually reverse engineer or decompile a program encoded as bytecode and the malicious users can use this knowledge to attack a server computer. Another technique that can be used to slow or stop the attacker can be to change the virtual machines and the interpreters that emulate the virtual machines. An instruction set architecture (ISA) is a model of a physical or virtual computing machine (e.g., a computer). An ISA specifies the instructions that execute on the machine, the operations of the machine, and at least portions of the physical or emulated hardware of the machine. Programs that use instructions from one ISA will operate on a machine conforming to that ISA, but may not operate on a different machine using a different ISA. A software interpreter can be configured to execute programs written only for a single ISA. Programs (e.g., client-side scripts) to be included with content can be compiled to different target ISAs so that different requests for the same content can be serviced by providing the same script that is implemented using different ISAs. Specifically, a first request can be serviced by responding with a script implemented as a first program and a first interpreter that both use the same ISA, and a subsequent request can be serviced by responding with the script implemented as another program and another interpreter that both use an ISA that is different than the original ISA. By changing the implementations of the script (e.g., by changing the ISAs), the malicious user may be stopped or slowed even further than using a single ISA.

Example Architectures for Obfuscating Programs Using Different ISAs

FIG. 1 illustrates an example of an updated program and an interpreter generated from an original program, according to one or more techniques for obfuscating a program using different instruction set architectures. Specifically, FIG. 1 illustrates an original HTML file and an original JavaScript file, and a modified HTML file, bytecode interpreter file, and bytecode file that are generated from the original HTML document and the original JavaScript document, according to an example embodiment. In FIG. 1, original HTML file 110 and original JavaScript file 120 are files comprising content that may be stored on, retrieved by, and/or generated by, a server computer in response to a request from a browser executing on a client computer. For example, an HTML document can specify the elements of a page to be displayed within a browser executing on a client device. The elements can include programs, such as programs specified in the JavaScript programming language, that can execute on the client device.

A computer, such as the server computer including compiler logic, may receive or retrieve original JavaScript file 120 and generate a bytecode interpreter 140 and a bytecode file 150. The computer may also receive or retrieve an HTML file 110 that includes or references original JavaScript file 120, and generate modified HTML file 130 that includes or references the bytecode interpreter 140 and/or a bytecode file 150. The compiler logic can include hardware and/or software modules executed in concert with, and/or by, one or more computers, such as a web server computer, or a computer coupled to a web server computer.

As illustrated in FIG. 1, the original HTML file 110 includes a JavaScript source reference 112. The JavaScript source reference 112 may reference one or more files comprising additional instructions, such as the original JavaScript file 120. The original JavaScript file 120 may include one or more methods, such as JavaScript methods 122 and 124, which comprise one or more instructions.

A compiler can transform a program specified with one type of instructions (such as program written in a high-level programming language) into a set of instructions that conform to a target ISA. For example, the compiler can transform the JavaScript instructions in methods 122 and 124 into a set of bytecode instructions 152 that conform to the target ISA. For example, the methods 122 and 124 can be compiled to potentially hinder or prevent attackers from identifying the instructions defined in the JavaScript methods 122 and 124. The compiler can also generate a software interpreter that emulates a machine that conforms to the target ISA. For example, the bytecode interpreter 140 can be generated or retrieved in response to receiving original JavaScript file 120. The bytecode interpreter 140 can include one or more sets of bytecode interpreter instructions 142, which may be used to interpret instructions contained in bytecode instructions 152. For example, bytecode interpreter 140 can be specified using JavaScript instructions and the bytecode instructions 152 can be specified using the target ISA. The bytecode file 150 is an example bytecode file that the compiler may generate in response to receiving original JavaScript file 120.

A modified HTML file 130 can be created to generate a result that is equivalent to the original HTML file 110. For example, a program output generated by the original JavaScript file 120 can be the same as a program output generated by the bytecode instructions 152 when they are interpreted by the bytecode interpreter 140. The modified HTML file 130 is an example HTML file that the compiler may generate in response to receiving the original HTML file 110. The modified HTML file 130 comprises interpreter reference 132 and bytecode instruction reference 134. Interpreter reference 132 may reference one or more files comprising interpreter instructions, such as bytecode interpreter 140. Bytecode instruction reference 134 may reference one or more files comprising one or more generated instructions, such as bytecode file 150. Additionally or alternatively, modified HTML file 130 may include instructions defining bytecode interpreter 140, such as bytecode interpreter instructions 142, and/or bytecode instructions 152, or portions of bytecode interpreter 140 and/or bytecode instructions 155.

The computer may send modified HTML file 130, bytecode interpreter 140, and bytecode file 150 to a client device (e.g., the browser on the client computer) that originally requested original HTML file 110.

As an example, assume Snippet 1 is a method specified in the JavaScript language and contained in original JavaScript file 120.

Snippet 1
function fold1(f, acc, list)
{
for (var i=0; i<list.length; ++i)
{
   acc=f(acc, list[i]);
}
console.log(acc);
return acc;
}

A compiler may parse Snippet 1, generate one or more data structures based on parsing Snippet 1 such as a syntax tree and/or a semantic graph, and generate one or more bytecode instructions based on the one or more generated data structures. For example, the compiler may generate the following set of code in Snippet 2:

Snippet 2
```
0: PUSH_FUN 0
1: ASSIGN_GLOBAL "fold1"
2: TERM
--
0: PUSH_IMMEDIATE_INT 0
1: ASSIGN_LOCAL 0
2: TARGET
3: DEREF_LOCAL 0
4: DEREF_LOCAL 1
5: PUSH_STRING "length"
6: GET_PROPERTY
7: LT
8: BRANCH_IF_TRUE 10
9: GOTO 24
10: TARGET
11: DEREF_LOCAL 2
12: DEREF_LOCAL 3
13: DEREF_LOCAL 1
14: DEREF_LOCAL 0
15: GET_PROPERTY
16: CALL2
17: ASSIGN_LOCAL 3
18: DEREF_LOCAL 0
19: COERCE_NUMBER
20: PUSH_IMMEDIATE_INT 1
21: PLUS
22: ASSIGN_LOCAL 0
23: GOTO 2
24: TARGET
25: DEREF_GLOBAL "console"
26: ASSIGN_LOCAL 4
27: DEREF_LOCAL 4
28: PUSH_STRING "log"
29: GET_PROPERTY
30: DEREF_LOCAL 4
31: DEREF_LOCAL 3
32: CALL 1
33: POP
34: DEREF_LOCAL 3
35: RETURN
```

In Snippet 2, each line is numbered differently to indicate the order of instructions as they are stored in memory. It should be noted that the instructions will be executed according to a control flow of the program that may differ from the stored order of the instructions. The line numbers of the instructions can also be used reference the instructions. For example, an instruction that references another instruction at a target location can refer to the line number of the target location. For example, Line 23 in Snippet 2 has a GOTO instruction that references Line 2 in Snippet 2, "TARGET."

The code in Snippet 2 has been output as a human-readable intermediate language. The intermediate language can be converted to bytecode. For example, each line in Snippet 2 may be mapped to one or more characters, numbers, or symbols that form bytecode instructions which may be understood by a bytecode interpreter. A particular interpreter may expect each instruction in Snippet 2 to correspond to a particular number. For example, "PUSH_IMMEDIATE_INT" may correspond to the number 14. When the particular interpreter reads the number 14, it executes a "PUSH_IMMEDIATE_INT" instruction. Thus, when executed by an interpreter, the alternate instructions in Snippet 3 perform the same steps as those illustrated by Snippet 2.

Snippet 3
```
{
code: "EgAAAwAAUg==",
functions: [{
    code:
      "DgAABQAABwAABwABEAABCCdQABdPADY-
       HAAIHAAMHAAEHAAAISA
       UAAwcAADQOAAEcBQAAT-
       wAGBgACBQAEBwAEEAADCAcABAcAA-
       OUAA QIHAANL",
    parameters: [2, 3, 1],
    locals: [0, 1, 2, 3, 4],
}],
objects: ["fold1", "length", "console", "log"],
scriptVarDecls: ["fold1" ]
}
```

Snippet 3 is a data structure that comprises bytecode instructions, as well as other information that the interpreter may use for executing the bytecode instructions. For example, the data structure in Snippet 3 comprises substructures "functions," "objects," and "scriptVarDecls." "Objects" and "scriptVarDecls" are arrays that indicate the global variables and strings used when executing the bytecode instructions, as seen above in Snippet 2. In other embodiments, the alternate instructions generated by the compiler may be stored in different formats or may not require use of a data structure.

The data structure in Snippet 3 comprises two "code" fields, each of which includes a set of bytecodes encoded as a base64 string. A corresponding interpreter can execute the first set of bytecodes in the first "code" field, which causes the corresponding interpreter to define a global object "fold1," as illustrated in the first section of Snippet 2.

The corresponding interpreter can execute the second set of bytecodes in the second "code" field, which causes the corresponding interpreter to define the behavior of the global object "fold1," as illustrated in the second section of Snippet 2. Code, a runtime environment, or an interpreter may reference or call the global object or function "fold1" as if "fold1" had been defined using the code in Snippet 1.

The "functions" field is an array of one or more functions. For purposes of illustrating a clear example, the "functions" field in Snippet 3 defines a single function. Each function in the array comprises "code," "parameters," and "locals" fields. The "code" field of each function is an array of bytecodes stored as a base64-encoded string.

The "parameters" field of each function is an array of parameters. Each element in the array may be the name of the parameter. For example, the first element of the parameters array, 2, corresponds to the first parameter, "f", on line 1 of Snippet 1. Therefore, "DEREF_LOCAL 2" in Snippet 2, corresponds to retrieving the first parameter of the function in Snippet 1.

The "locals" field of each function is an array that indicates the local variables used in the function. In Snippet 3, the "locals" field includes variables zero through four because variables zero through four are referenced in the instructions in Snippet 2.

The "objects" field may include zero or more objects that may be used by the bytecode. For example, "length," from line 5 of Snippet 2, is stored in the "objects" field. The bytecode on line 4 can include a reference or index to "length" in the "objects" field, instead of including "length" as a string in the bytecode.

The "scriptVarDecls" field identifies one or more variables that should be declared before the interpreter executes the bytecode. The one or more variables need not be defined, instantiated, or assigned one or more values or objects.

Execution of the alternate instructions 152 using a corresponding interpreter 140 may return the same value(s) or store the value(s) in the same parameter(s) as the original instructions 120 if the original instructions were executed. The interpreter may use objects, variables, or references to retrieve data from, or store data to, one or more objects or variables.

The bytecode interpreter 140 comprises one or more bytecode interpreter instructions 142 which, when executed by a browser on a client computer, causes the browser to interpret or execute bytecode file 150. In an embodiment, bytecode interpreter 140, when executed by a browser with a JavaScript runtime environment, may configure the runtime environment to interpret or execute bytecode file 150. In an embodiment, bytecode interpreter 140 may be a set of JavaScript instructions.

In an embodiment, bytecode interpreter 140 is programmed or configured to interpret a set of bytecode operations of an ISA. A call to a particular bytecode operation in the set of bytecode operations may cause bytecode interpreter 140 to execute the particular bytecode operation. Executing the particular bytecode operation may comprise executing one or more bytecode interpreter instructions 142 corresponding to the particular bytecode operation.

As an example, the set of bytecode operations may include a read operation, a write operation, and an add operation. Bytecode interpreter 140 may include a first function corresponding to the read operation, a second function corresponding to the write operation, and a third function corresponding to the add operation. Assume bytecode instructions 152 includes a call to the add operation. Bytecode interpreter 140 may interpret the call to the add operation and execute the add operation by executing the third function.

Additionally, executing the particular bytecode operation may include reading one or more parameters, returning one or more values, and/or storing one or more values in one or more respective parameters. Referring to the above example, executing the add operation may include reading two or more input values and passing the input values as parameters to the third function. The third function may also return a result of the add operation and/or store the result to a specified parameter or variable.

In an embodiment, the compiler may generate a first set of bytecode instructions for a first interpreter to be used for executing the first set of bytecode instructions. As an example, the add operation may be represented in the first set of bytecode instructions by the character string "aa" for the first interpreter. Other operations may be represented in the first set of bytecode instructions by respective other sets of characters, numbers, and/or letters. The respective sets of characters are interpreted by the first interpreter to perform the corresponding operations.

For a second interpreter, the bytecode operations may each be associated with different encodings (e.g., a different respective set of numbers, letters, and/or characters). Referring to the above example, the add operation may be represented in a second set of bytecode instructions by the character string "ddlc" for the second interpreter. Thus, the first interpreter cannot properly interpret the second set of bytecode instructions and the second interpreter cannot properly interpret the first set of bytecode instructions when the interpreters are configured using different encodings for the instructions. However, both the first set of bytecode instructions and the second set of bytecode instructions call the same sequence of bytecode operations. The first set of bytecode instructions when executed by the first interpreter, and the second set of bytecode instructions when executed by the second interpreter, cause the same output and effects.

Figure 2:
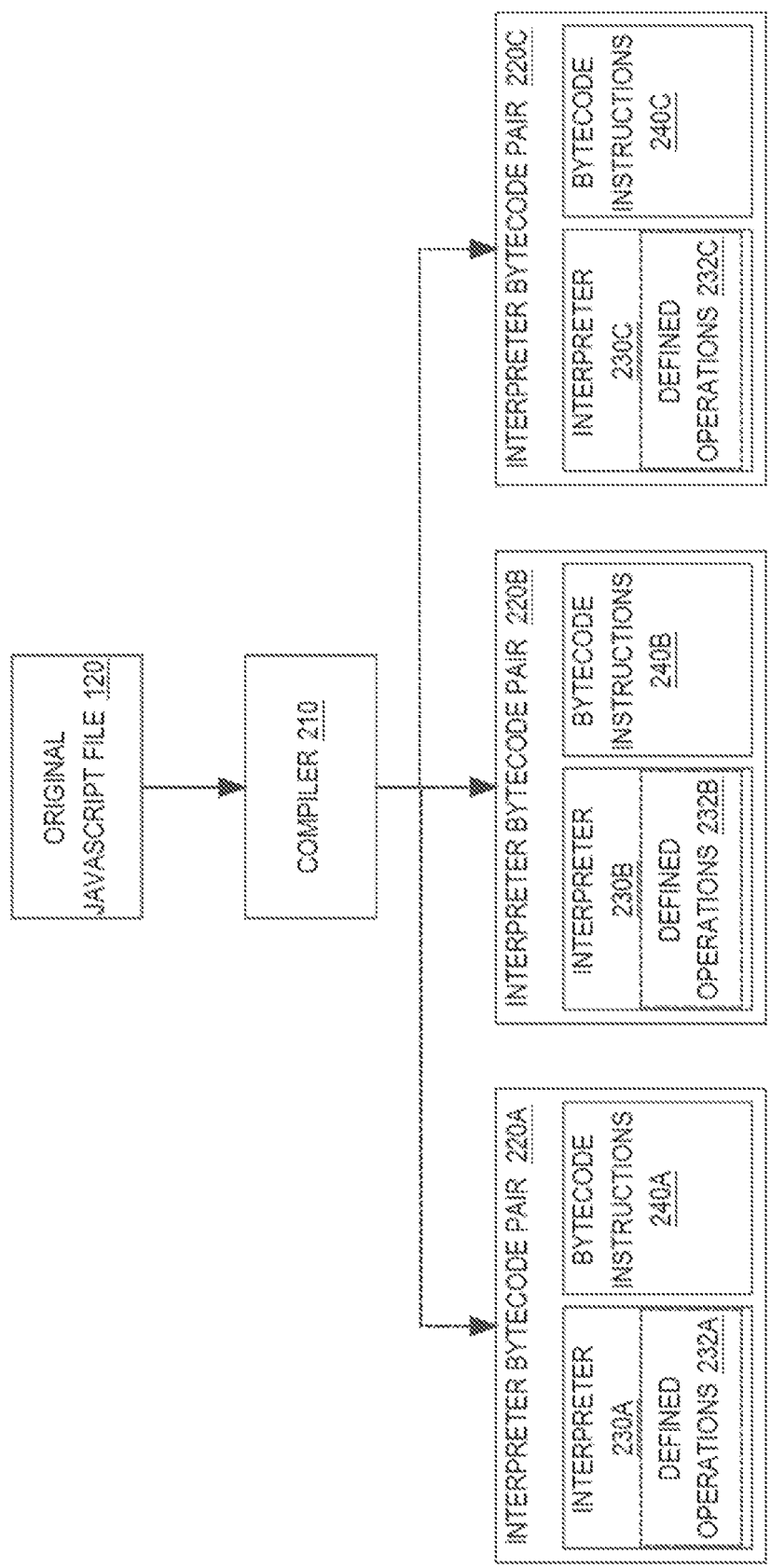
FIG. 2 illustrates an example of a plurality of program-interpreter pairs generated from an original program, according to one or more techniques for obfuscating a program using different instruction set architectures.

FIG. 2 illustrates an example of a plurality of program-interpreter pairs generated from an original program, according to one or more techniques for obfuscating a program using different instruction set architectures. Specifically, FIG. 2 illustrates an original JavaScript file 120 and a plurality of interpreter-bytecode pairs 220A-C that may be generated based on the original JavaScript file 120. Each pair of the interpreter-bytecode pairs 220A-C can conform to a different ISA.

As one example, a compiler 210 can receive the original JavaScript file 120. Based on the original JavaScript file 120, the compiler 210 may generate a plurality of interpreter-bytecode pairs, such as interpreter bytecode pair 220A, interpreter bytecode pair 220B, and interpreter bytecode pair 220C. Each interpreter bytecode pair comprises a respective interpreter and set of one or more bytecode instructions. The bytecode instructions correspond to the bytecode operations defined by the corresponding interpreter. Each interpreter conforms to and can implement a different respective ISA. As one example, the interpreters 230A, 230B, and 230C may support the same set of bytecode operations, but represent operations, parameters, etc. using different encodings for the bytecode. Specifically, the bytecode instructions for each interpreter can be represented by different respective sets of numbers, letters, and/or characters. For example, each of defined operations 232A, 232B, and 232C may map the same bytecode operation to a different operation name.

In an embodiment, compiler 210 may select a particular bytecode interpreter from a plurality of bytecode interpreters for generating the corresponding bytecode instructions. The selection may be done randomly, pseudo-randomly, or based on user configurations. For example, the computer may store a plurality of bytecode interpreters, such as interpreters 230A, 230B, and 230C. The compiler 210 may use a random number generator to select one of interpreter 230A, 230B, and 230C, retrieve the selected interpreter, and generate the corresponding bytecode instructions for the selected interpreter.

Additionally or alternately, the compiler 210 may generate and store the bytecode interpreter pairs 220A, 220B, and 220C, and select one of the stored pairs for replacing original JavaScript file 120 and/or a reference to original JavaScript file 120.

Additionally or alternately, the computer may store one or more data defining a plurality of functions, where each function corresponding to a respective bytecode operation. The compiler 210 may generate, for each bytecode operation, a set of numbers, letters, and/or characters representing the bytecode operation. The compiler 210 may generate an interpreter that includes the plurality of functions, where the interpreter maps each function to the set of numbers, letters, and/or characters generated for the corresponding bytecode operation. For example, a function may comprise instructions that, when executed, perform a "push" operation. The compiler may generate the character string "yyzz" for representing the "push" operation, and generate one or more instructions that cause the function to be executed when the character string "yyzz" is read from a set of bytecode instructions.

Referring to FIG. 2, interpreter 230A defines a set of bytecode operations 232A. Compiler 210 may generate bytecode instructions 240A based on original JavaScript file 120 and defined operations 232A. Bytecode instructions 240A comprise calls to bytecode operations in defined operations 232A. Similarly, interpreter 230B defines a set of bytecode operations 232B. Compiler 210 may generate bytecode instructions 240B based on original JavaScript file 120 and defined operations 232B. Bytecode instructions 240B comprise calls to bytecode operations in defined operations 232B.

The instructions contained in bytecode interpreter pair 220A and bytecode interpreter pair 220B may therefore be different from one another. However, both bytecode instructions 240A, when executed by interpreter 230A, and bytecode instructions 240B, when executed by interpreter 230B, in a particular execution environment, are both functionally equivalent to the instructions in original JavaScript file 120 executed in the particular execution environment.

Additionally, as explained in further detail below, each of defined operations 232A, 232B, and 232C may include a respective set of one or more combined bytecode operations. The respective set of one or more combined bytecode operations may differ for each of interpreters 230A, 230B, and 230C.

For example, defined operations 232A may include a plurality of combined bytecode operations. Defined operations 232B and 232C may each include some, all, or none of the combined bytecode operations of the plurality of combined bytecode operations. Furthermore, even if defined operations 232A, 232B, and 232C included the same combined bytecode operation, the combined bytecode operation may correspond to a different set of numbers, letters, and/or characters for each of interpreters 230A, 230B, and 230C.

Converting human-readable instructions to bytecode instructions may provide one level of defense against an attacker learning the behavior of the program. However, an attacker can potentially perform dynamic analysis of the bytecode instructions by executing the bytecode instructions and monitoring the function calls made by the interpreter. The dynamic analysis can aid the attacker in attempting to determine the functionality defined by the bytecode instructions. For example, human-readable JavaScript in a web page may define an original method, which when executed, branches based on the input provided to the method. The bytecode instructions, when executed by an interpreter, also branches based on the input. An attacker may monitor execution of the bytecode instructions to determine what branches are followed for different inputs. Additionally, the attacker may use this information to attempt to map interpreter functions to bytecode operations.

Combining bytecode operations may be used to further prevent, slow, and/or deter attacks. A combined bytecode operation is a bytecode operation that combines a sequence of two or more original bytecode operations and, when executed by an interpreter, performs the work the sequence of two or more original bytecode operations would have performed when executed by the interpreter.

For example, Snippet 4 is a sequence of bytecode instructions contained in bytecode instructions 152. For the purpose of illustrating a clear example, the bytecode operations are written using human-readable operation and variable names.

Snippet 4
Line 01: Push 1
Line 02: Push Var x
Line 03: Add
...
Line 11: Push 2
Line 12: Push Var Y
Line 13: Add Lines 1-3 and 11-13 of Snippet 4 each include two calls to a "push" operation followed by a call to an "add" operation. A combined bytecode operation may correspond to, for example, two "push" operations, a "push" operation followed by an "add" operation, or two "push" operations followed by an "add" operation.

In an embodiment, the compiler generates a sequence of bytecode operations based on the original instructions. The compiler may analyze the set of bytecode operations to identify one or more common sub-sequences of instructions, and select one or more particular sub-sequences of instructions from which to generate combined bytecode operations. In other words, rather than selecting sub-sequences of instructions and defining combined bytecode operations prior to performing compilation, the compiler selects the sub-sequences of instructions and generates corresponding combined bytecode operations based on analyzing the sequence of bytecode instructions it originally generated. Thus, the combined bytecode operations generated for each set of original instructions may be different, since the set of bytecode instructions that are generated based on those original instructions are also different.

In an embodiment, to identify the common sub-sequences of instructions, the compiler identifies all sequences of a given length, e.g. three operations, and sorts the sequences based on the frequency with which they appear in the sequence of bytecode operations. The compiler may select a particular number of the most frequent sequences for generating combined bytecode operations. The sequence length(s), sorting order, number of combined bytecode operations, and/or the method by which sequences are selected for generating combined bytecode operations may vary depending on the particular implementation. For example, selecting the most frequently occurring sequences may result in a more compact set of bytecode instructions. Other sequences may be selected based on, for example, a specified list of possible sequences, user configurations, or other optimization considerations such as execution efficiency or obfuscation complexity.

Referring to the above example, assume a compiler determines that the sequence comprising two "push" operations followed by an "add" operation will be combined into a new combined bytecode operation, "push_push_add." The combined bytecode operation "push_push_add," when executed by an interpreter, performs a first push operation, a second push operation, and an add operation.

The compiler may replace one or more instances of a bytecode sequence with a combined bytecode operation corresponding to the sequence. For example, the compiler may generate the following modified bytecode instructions in Snippet 5.

Snippet 5
Line 01: Push_Push_Add 1, Var X
...
Line 09: Push_Push_Add 2, Var Y

In Snippet 5, the first sequence of operations, from Lines 1-3 of Snippet 4, has been replaced with a single "push_push_add" operation. The two parameters from the "push" operations of the original sequence, "1" and "Var X," are provided to the combined bytecode operation. Similarly, the second sequence of operations, from Lines 11-13 of Snippet 4, has been replaced with another "push_push_add" operation, with the parameters "2" and "Var Y."

Although in the above example both sequences of operations were replaced by the combined bytecode operation, the compiler need not replace all instances of a sequence of operations with the corresponding combined bytecode operation. Additionally, different instances of a sequence of operations may be replaced by different combined bytecode operations. For example, referring to Snippet 4, the compiler may replace Lines 1-3 with "push_push_add" but not replace Lines 11-13, or vice versa. As another example, the compiler may replace Lines 1-3 with "push_push_add," replace Lines 11-12 with a "push_push" operation, and not replace Line 13.

In some embodiments, determining which sequences to replace with a combined bytecode operation may be performed randomly. Thus, a compiler may generate a different set of bytecode instructions each time it executes, even if the interpreter and the set of combined bytecode operations remain the same.

In an embodiment, the compiler generates a respective set of one or more interpreter instructions for each combined bytecode operation. The set of one or more interpreter instructions, when executed, produce the same output and/or effects as the corresponding sequence of operations. Generating a set of one or more interpreter instructions for a combined bytecode operation may comprise retrieving or generating interpreter instructions corresponding each bytecode operation and combining the retrieved or generated interpreter instructions.

For example, assume a first function or method corresponds to the "push" operation and a second function or method corresponds to the "add" operation. Generating instructions for the "push_push_add" operation may comprise generating a third function that includes a first set of instructions contained in the first function (the first "push" operation), a second set of instructions that are the same as the first set of instructions (the second "push" operation), and a third set of instructions contained in the second function (the "add" operation).

Additionally, generating the set of one or more interpreter instructions may include combining the input parameters, if any, for each bytecode operation of the sequence. Referring to the above example, the "push" operation includes a parameter specifying a value to push onto the stack. The "push_push_add" operation may include two parameters—a first parameter corresponding to the first push operation and a second parameter corresponding to the second push operation.

As discussed above, the compiler may generate different pairs of bytecode instructions and interpreters. Each interpreter may support a different set of bytecode operations, reference the same bytecode operations using different names, include different combined bytecode operations, and/or reference the same combined bytecode operations using different names. Thus, each time the compiler compiles a set of original instructions, it may generate a different interpreter and/or set of bytecode instructions.

Figure 3:
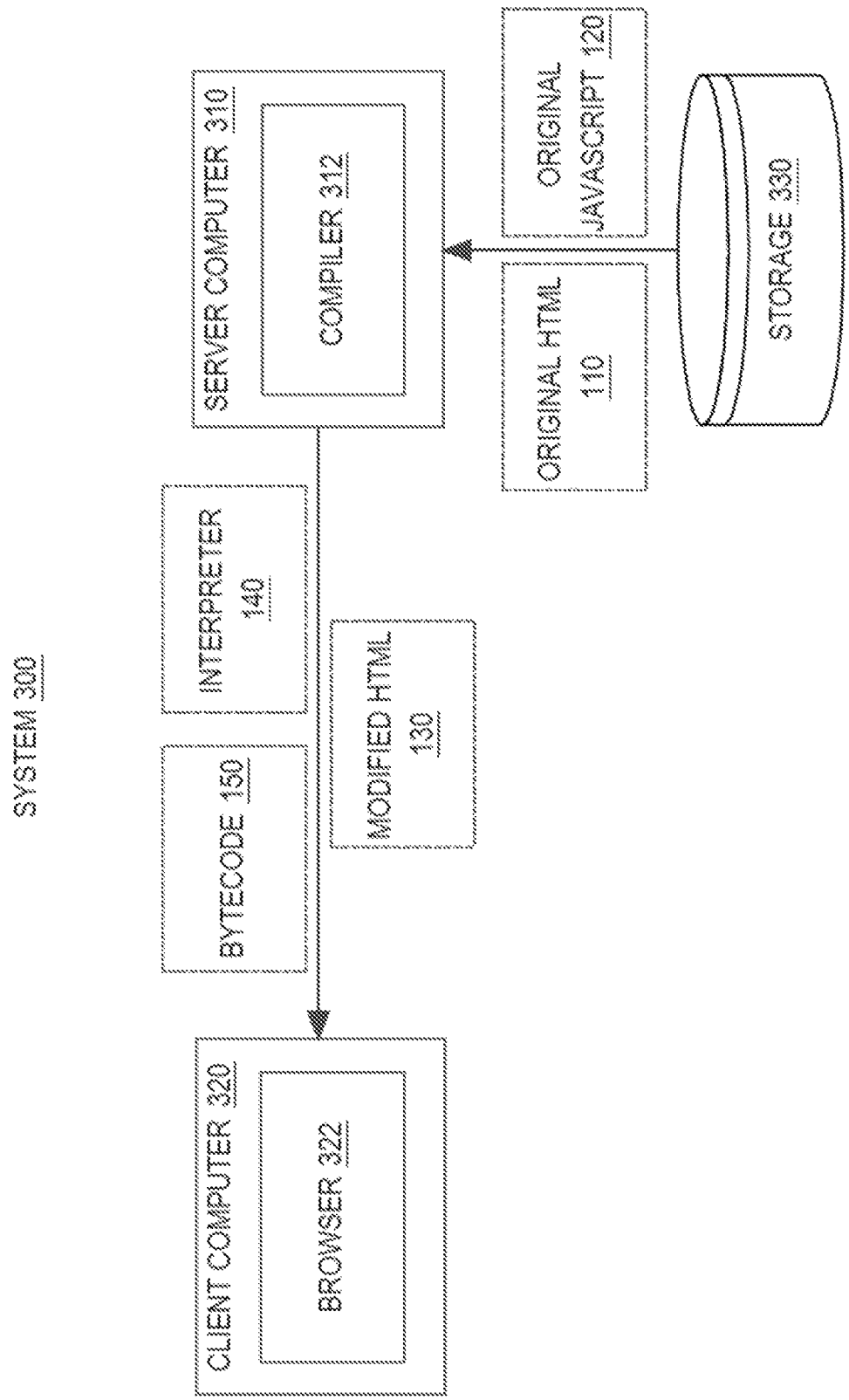
FIG. 3 illustrates an example client-server computer system that can be used for obfuscating a program using different instruction set architectures.

FIG. 3 illustrates an example client-server computer system 300 that can be used for obfuscating a program using different instruction set architectures. For example, the system 300 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 3 illustrates only one of many possible arrangements of components configured to execute the programming described herein. Other arrangements may include fewer or different components, and the division of work between the components may vary depending on the arrangement.

FIG. 3 illustrates a computer system comprising a browser, a web infrastructure, and a server computer, which may be configured to generate, receive, or retrieve a web page, convert one or more human-readable instructions in the web page into bytecode, and execute the bytecode instructions on a client computer, in an example embodiment. In FIG. 3, system 300 comprises a server computer 310 communicatively connected to a client computer 320 and a storage 330. Server computer 310 may be connected to client computer 320 and storage 330 through any kind of computer network using any combination of wired and wireless communication, including, but not limited to: a Local Area Network (LAN), a Wide Area Network (WAN), one or more internetworks such as the public Internet, or a company network.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

In FIG. 3, client computer 320 is executing a browser 322. Browser 322 may be a browser as described herein and executed on a client computer, such as client computer 320. Additionally, browser 322 may be a bot comprising one or more of the components traditionally found in a browser.

Server computer 310 may comprise one or more computing devices that receives and/or intercepts requests for data from users through one or more client computers, such as client computer 320. The one or more computing devices of server computer 310 may, but need not, be owned and/or managed by one or more independent entities and may span across one or more computer networks, such as the Internet.

Server computer 310 may respond to the requests for data by sending data to the browser that sent the request. As illustrated in FIG. 3, the data sent from server computer 310 may include one or more types of instructions, such as HTML, JavaScript, CSS, and/or any other standard or proprietary instructions.

For example, server computer 310 may be an HTTP-based web server that receives HTTP requests and responds with data comprising HTML and/or JavaScript instructions. Additionally or alternatively, the server computer may respond with data that references data on other computing devices in, and/or outside of, server computer 310.

In FIG. 3, server computer 310 is illustrated as sending instructions to and receiving requests from a particular type of client application, i.e. browser 322. However, server computer 310 may be programmed or configured to send instructions to and receive requests from any type of user agent application, including bots.

In an embodiment, in response to receiving a request from a client computer, such as client computer 320, server computer 310 may receive and/or retrieve instructions, parse and/or execute one or more of the instructions, generate and/or add new instructions, and send the modified and/or new instructions to the client computer.

For example, server computer 310 may retrieve original HTML file 110 and original JavaScript file 120, generate modified HTML file 130, bytecode interpreter 140, and bytecode file 150, and send modified HTML file 130, bytecode interpreter 140, and bytecode file 150 to browser 322.

In the example illustrated by FIG. 3, server computer 310 includes a compiler 312. Additionally, server computer 310 may include other applications, software, and other executable instructions to facilitate various aspects of embodiments described herein.

Compiler 312 comprises program instructions that are programmed or configured to perform functions for generating a set of bytecode instructions based on a set of original instructions. Compiler 312 may process instructions retrieved or received at server computer 310 and generate one or more in-memory data structures that correspond to one or more objects defined in the instructions. Processing the instructions may comprise parsing and/or executing the instructions.

In an embodiment, compiler 312 may parse the instructions to generate a syntax tree for the original instructions. Additionally or alternatively, compiler 312 may analyze the semantics of the original instructions and generate a data structure representing the semantics of the instructions. For example, compiler 312 may parse the original instructions and generate a semantic graph. Additionally or alternatively, compiler 312 may perform type checking or scope checking on the received or retrieved instructions.

In addition, compiler 312 may make requests for and/or retrieve additional data. For example, if the instructions reference one or more other instruction files, then compiler 312 may request or retrieve the one or more instruction files.

After processing the instructions, compiler 312 may generate a set of one or more bytecode instructions based on the one or more generated data structures, such as a syntax tree and/or a semantic graph. Additionally, compiler 312 may generate one or more combined bytecode operations based on the set of one or more bytecode instructions, and modify the set of one or more bytecode instructions by replacing one or more sequences of bytecode instructions with calls to combined bytecode operations.

In an embodiment, the set of one or more bytecode instructions replace one or more original JavaScript instructions. The set of one or more bytecode instructions, when executed using a corresponding bytecode interpreter, cause the same effects and/or outputs as the one or more JavaScript instructions.

Additionally, compiler 312 may be programmed or configured to generate a set of one or more interpreter instructions defining a corresponding bytecode interpreter for interpreting the generated set of bytecode instructions, such as bytecode interpreter 140. Compiler 312 may retrieve one or more stored bytecode instructions, for example from storage 330, modify the one or more stored bytecode instructions, and/or generate one or more additional bytecode instructions for interpreting the one or more combined bytecode operations generated by compiler 312.

Additionally, compiler 312 may render an alternate set of instructions based on the generated set of one or more bytecode instructions, such as modified HTML file 130. The set of alternate instructions may reference and/or include the generated set of one or more bytecode instructions and/or the bytecode interpreter instructions.

For ease and clarity of illustration, certain operations, functions, and programming described herein are ascribed to the compiler 312 of FIG. 3. However, in some embodiments, the same operations, functions, and programming may be implemented in programs or logic that is separate from compiler 312, such as a utility program or library. For example, the function of parsing a set of original instructions to generate one or more data structures, syntax trees, semantic graphs, etc. may be implemented in a separate parser that provides output to compiler 312. As another example, the function of generating the bytecode interpreter and/or the modified HTML file may be implemented in a function, program, or module, separate from compiler 312. Additionally, compiler 312 may communicate or interface with other applications, software, or modules that are executed by server computer 310 as needed to implement the functionality described herein.

In an embodiment, storage 330 is a data storage subsystem consisting of programs and data that is stored on any suitable storage device such as one or more hard disk drives, memories, or any other electronic digital data recording device configured to store data. Although storage 330 is depicted as a single device in FIG. 3, storage 330 may span multiple devices located in one or more physical locations. For example, storage 330 may include one or nodes located at one or more data warehouses. Additionally, in one embodiment, storage 330 may be located on the same device or devices as server computer 310. Alternatively, storage 330 may be located on a separate device or devices from server computer 310.

Storage 330 may store data related to bytecode conversion, such as: data defining one or more bytecode grammar that indicate one or more rules for converting instructions to alternate instructions, for example converting from JavaScript instructions to bytecode; data that indicates whether particular web pages should be processed and/or modified to generate bytecode instructions; data indicating one or more rules for generating combined bytecode instructions, for example how to determine what bytecode instructions to merge.

Storage 330 may also store original instructions, such as original HTML file 110 and original JavaScript file 120, that may be requested by client computers, such as client computer 320. In some embodiments, storage 330 may store one or more sets of bytecode interpreter instructions. Additionally, storage 330 may store one or more generated bytecode instructions in association with each set of bytecode interpreter instructions.

Example Processes for Obfuscating Programs Using Different ISAs

Figure 4:
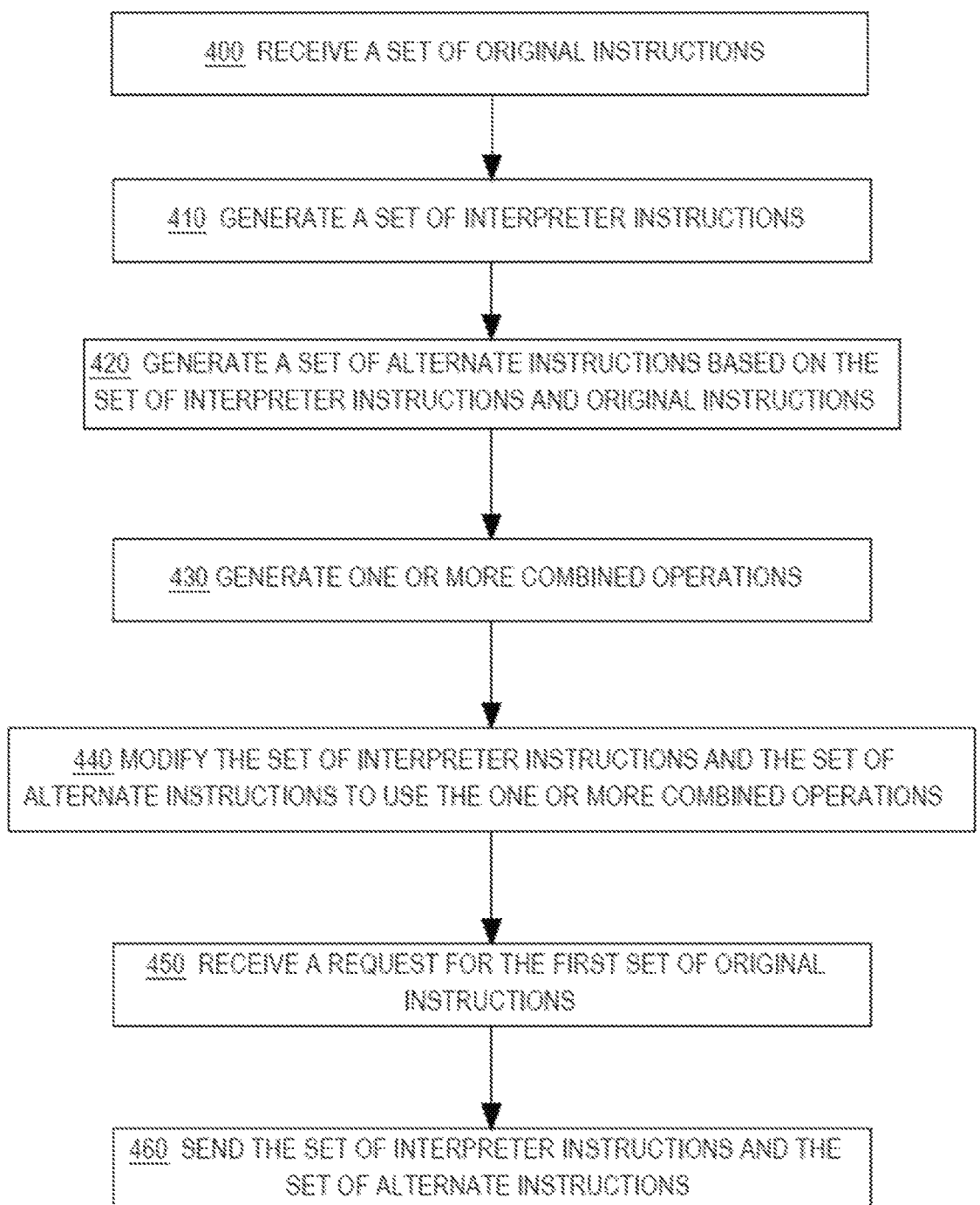
FIG. 4 illustrates an example process for generating an updated program and an interpreter based on an original program.

FIG. 4 illustrates an example process for generating an updated program and an interpreter based on an original program. Specifically, FIG. 4 illustrates an example process for receiving or retrieving original instructions, generating new instructions, and sending the new instructions to the intended client computer.

Although the steps in FIG. 4 are shown in an order, the steps of FIG. 4 may be performed in different orders, and are not limited to the order shown in FIG. 4. Additionally, some steps may be optional, may be performed multiple times, and/or may be performed by different components. All steps, operations, and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 400, a server computer receives or retrieves a set of original instructions. For example, server computer 310 may retrieve original instructions from storage 330. Server computer 310 may retrieve the original instructions in response to a request from browser 322. Additionally or alternately, server computer 310 may retrieve the original instructions in response to a request to compile the instructions. The instructions may define one or more objects and one or more operations which operate on the objects. The instructions may comprise HTML, CSS, and/or JavaScript. As an example, server computer 310 may retrieve or receive original HTML file 110 and original JavaScript file 120, and send original JavaScript file 120 to compiler 312.

In step 410, the server computer generates a set of one or more interpreter instructions that define an interpreter. The interpreter supports a set of bytecode operations. A call to a particular bytecode operation in a set of bytecode instructions may cause the interpreter to execute instructions corresponding to the particular bytecode operation.

In an embodiment, a plurality of bytecode interpreters may be available. The server computer may select a particular bytecode interpreter from the plurality of bytecode interpreters. As an example, server computer 310 may select one of interpreter 230A, 230B or 230C.

Additionally or alternatively, the server computer may generate, for each bytecode operation of a plurality of bytecode operations, a set of numbers, letters, and/or characters representing the bytecode operation. The server computer may generate interpreter instructions where each set of numbers, letters, and/or characters causes the interpreter to execute instructions for the corresponding bytecode operation.

In step 420, the server computer generates a set of one or more alternate instructions based on the set of original instructions. The server computer may determine one or more alternate instructions that are functionally equivalent to the original instructions. An alternate set of instructions may be functionally equivalent to an original set of instructions if when executed, given a particular set of one or more inputs, the alternate instructions produce the same output(s) or effect(s) as the original instructions when executed given the same particular set of one or more inputs. The alternate instructions may be executed in the same execution environment as the original instructions. Additionally or alternatively, one or more of the instructions in the alternate instructions may be executed by an interpreter that is not used to execute the one or more original instructions.

The set of alternate instructions may comprise bytecode instructions. The interpreter instructions may comprise JavaScript instructions that define a JavaScript interpreter configured to execute the bytecode instructions. For example, assume server computer 310 generated a set of interpreter instructions based on interpreter 230A. Server computer 310 may generate corresponding bytecode instructions 240A based on the methods and objects defined in original JavaScript file 120 and the operations 232A supported by interpreter 230A.

At step 430, the server computer generates one or more combined operations. Each combined operation combines a sequence of one or more operations supported by the interpreter. In an embodiment, generating the one or more combined operations is based on the set of one or more alternate instructions. For example, server computer 310 may identify a plurality of sequence of operations contained in bytecode instructions 240A. Server computer 310 may select one or more sequences from the plurality and generate a respective combined operation for each selected sequence.

At step 440, the set of interpreter instructions and the set of alternate instructions are modified to use the one or more combined operations. In an embodiment, modifying the set of interpreter instructions comprises generating additional interpreter instructions for executing the one or more combined operations and adding the additional interpreter instructions to the set of interpreter instructions. In an embodiment, modifying the set of alternate instructions comprises replacing one or more sequences of operations with corresponding combined operations.

Additionally, the server computer may obfuscate the modified set of alternate instructions. For the purpose of illustrating a clear example, assume the modified set of alternate instructions comprise bytecode. The server computer may obfuscate the bytecode using, for example, opcode shuffling or other bytecode obfuscation techniques.

At step 450, a request is received for the set of original instructions. For example, server computer 310 may receive a request from client computer 320 for original HTML file 110.

At step 460, in response to the request for the set of original instructions, the server computer sends the modified set of interpreter instructions and the modified set of alternate instructions.

In an embodiment, sending the modified set of interpreter instructions and the modified set of alternate instructions may comprise generating and sending a set of modified instructions. The set of modified instructions may comprise the modified set of interpreter instructions and the modified set of alternate instructions. Alternately, the set of modified instructions may comprise references to file(s) containing the modified set of interpreter instructions and/or the modified set of alternate instructions. Additionally, the set of modified instructions may include instructions from the original instructions that were not converted into the set of alternate instructions.

In an embodiment, the set of modified instructions may include a modified HTML file, such as modified HTML file 130. The modified HTML file 130 may include a reference to a file containing the interpreter instructions, such as interpreter reference 132, and a reference to a file containing the bytecode instructions, such as bytecode instruction reference 134. Additionally or alternatively, modified HTML file may include bytecode interpreter instructions, such as bytecode interpreter instructions 142 and bytecode instructions, such as bytecode instructions 152.

Using the networked computer arrangements, intermediary computer, or processing methods described herein, security in client-server data processing may be increased. The bytecode obfuscation techniques discussed herein can potentially reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, can be frustrated because the instructions contained in a web page are not human-readable and object identifiers and operations may be difficult to identify.

The embodiments described herein are capable of generating multiple different programs (where each program can include a set of bytecode instructions) and/or bytecode interpreters, where each program/interpreter pair can implement a different ISA and produce an equivalent result. Using different ISAs can increase software diversity. Therefore, when an attacker requests a web page in different requests, the attacker may receive a different set of instructions which further increases the difficulty for an attacker to perform either static or dynamic analysis of the instructions of the web page.

The technology described herein may differ from other compiler technology because a typical compiler can generate a set of instructions for a target machine, but a typical compiler may not generate an interpreter for a target ISA and a program that is specified to be executed by the interpreter. Furthermore, a compiler typically translates code from one language to another (e.g. human-readable code to machine-executable code). In contrast, the present techniques describe generating an interpreter that executes in the same way as the original code. For example, based on an original set of JavaScript instructions, a JavaScript interpreter and a set of bytecode may be generated. Both the original set of JavaScript instructions and the JavaScript interpreter are written in the same language, JavaScript, and are intended to run in the same execution environment, e.g., a JavaScript runtime environment.

In addition, the use of combined bytecode operations further obfuscates a set of bytecode instructions. For example, unrelated portions of program code may call the same combined bytecode operation. If an attacker is monitoring execution of the bytecode instructions, the unrelated portions of code would appear to be branching to the same operation(s). As another example, the set of bytecode instructions may comprise an array of functions and an array of parameters for the functions. If a function requires a parameter, then the next parameter in the array may be read as input for the function. However, it is difficult to determine which parameters correspond to which functions when viewing the bytecode multiple parameters may be read for a combined operation, or an operation may not need a parameter at all and the next parameter is for a subsequent operation—there is not necessarily a one-to-one correlation between parameters and functions/operations.

As another example, a program may be obfuscated by adding additional program branches. The branches may lead to different parts of the code that perform the same function. That is, if a user were monitoring execution of the program, the same input may result in the program following different branches, although each branch produces the same result. The use of combined operations may further obfuscate the operations performed at each branch. For example, even if both branches included the same sequence of operations, a sub-sequence contained in one branch may be replaced with a combined operation while the other remained the same. Thus, the branches would appear to be different while being functionally the same.

The use of combined bytecode operation also allows for more efficient execution by the interpreter, compared to bytecode instructions that do not use combined bytecode operations. Although the work performed by the operations is the same, the program does not need to 'jump' between lines of code or retrieve/store parameters several times. The work may also be optimized when generating the interpreter instructions for the combined bytecode operation. For example, if a first operation stores a value to a local variable and a second operation retrieves the value and performs a calculation using the value, the steps of storing and retrieving the value to/from the local variable could be removed. Additionally, use of combined bytecode operations may result in a smaller set of bytecode instructions.

Therefore, embodiments can potentially achieve reductions in data size, use of network bandwidth, and use of CPU cycles at the client computing device.

As another example, a computer system comprises one or more processors and a digital electronic memory storing instructions. The instructions, when executed by the one or more processors, cause the one or more processors to perform a method. The method includes processing a first set of original instructions that produce a first set of outputs or effects when executed by a browser of a client computer. The method includes generating a first set of interpreter instructions that define a first interpreter. The first interpreter supports a first plurality of operations, where each operation of the first plurality of operations is associated with a respective alternate instruction. Generating the first set of interpreter instructions further comprises: generating a first combined operation that combines a first sequence of two or more operations of the first plurality of operations; generating a new alternate instruction corresponding to the first combined operation; and associating the first combined operation with the new alternate instruction. The method includes generating, based on the first set of original instructions, a first set of alternate instructions which, when executed by the first interpreter, produces the first set of outputs or effects, wherein the first set of alternate instructions include the new alternate instruction. The method includes receiving, from the client computer, a request for the first set of original instructions. In response to receiving the request, the first set of interpreter instructions and the first set of alternate instructions are sent to the client computer.

Generating the first set of alternate instructions can include identifying one or more instances of the sequence of two or more operations and replacing one or more particular instances of the sequence of two or more operations with the first combined operation. The one or more instances of the sequence of two or more operations can include a first instance and a second instance. Replacing the one or more particular instances can include replacing the first instance of the sequence of two or more operations with the first combined operation and does not include replacing the second instance of the sequence of two or more operations with the first combined operation.

The method can include generating, based on the first set of original instructions, a second set of alternate instructions which, when executed by the first interpreter, produces the first set of outputs or effects, where the second set of alternate instructions is different from the first set of alternate instructions. The method can include generating a second set of interpreter instructions that define a second interpreter, where the second interpreter supports a second plurality of operations. The second plurality of operations can include a second combined operation that combines a second sequence of two or more operations of the second plurality of operations. The method can include generating, based on the first set of original instructions, a second set of alternate instructions which, when executed by the second interpreter, produces the first set of outputs or effects. The second combined operation is different from the first combined operation and the second set of alternate instructions is different from the first set of alternate instructions.

The method can include processing a second set of original instructions that produce a second set of outputs or effects when executed by the browser of the client computer. The method can include generating a second set of interpreter instructions that define a second interpreter, where the second interpreter supports a second plurality of operations, the second plurality of operations including a second combined operation that combines a second sequence of two or more operations of the second plurality of operations. The method can include generating, based on the second set of original instructions, a second set of alternate instructions which, when executed by the second interpreter, produces the second set of output or effects. The method can include receiving, from the client computer, a request for the second set of original instructions. The method can include in response to receiving the request, sending the second set of interpreter instructions and the second set of alternate instructions to the client computer.

The first set of interpreter instructions, when executed by the browser, can cause the browser to execute the first set of alternate instructions. Generating the first set of interpreter instructions can include generating one or more particular interpreter instructions that, when executed by the browser, cause the browser to execute the first combined operation. The first interpreter can be a bytecode interpreter, the first plurality of operations can be a plurality of bytecode operations, the first combined operation can combine a sequence of two or more bytecode operations, and the first set of alternate instructions can include one or more bytecode instructions.

In another example, a computer system comprises one or more processors and a digital electronic memory storing instructions. The instructions, when executed by the one or more processors, cause the one or more processors to perform a method. The method includes processing a set of original JavaScript code that produce a set of outputs or effects when executed by a browser of a client computer. The method includes generating a set of JavaScript code that defines a bytecode interpreter, where the bytecode interpreter supports a plurality of bytecode operations. The method includes generating, based on the set of original JavaScript code and the plurality of bytecode operations supported by the bytecode interpreter, a set of bytecode, wherein the set of bytecode is functionally equivalent to the set of original JavaScript code when the set of bytecode is executed by the bytecode interpreter. The method includes identifying, in the set of bytecode, one or more target sequences of bytecode operations. For each target sequence of bytecode operations: a combined bytecode operation that combines the target sequence of bytecode operations is generated; the set of JavaScript code that defines the bytecode interpreter is modified to support the combined bytecode operation; and, in the set of bytecode, one or more instances of the target sequence of bytecode operations is replaced with the combined bytecode operation. The set of bytecode and the set of JavaScript code that defines the bytecode interpreter is sent to the client computer. The set of bytecode and the set of JavaScript code that defines the bytecode interpreter, when executed by the client computer, cause the client computer to produce the set of outputs or effects.

Example Computing Environments

According to one embodiment, the techniques described herein are implemented by at least one computing device. The techniques may be implemented in whole or in part using a server computer, an intermediary server computer (such as a network traffic management computer or a proxy device), and/or other computing devices that are coupled using a network, such as a packet data network. An intermediary server computer can perform various proxy and other services on behalf of a server computer, such as load balancing, rate monitoring, caching, encryption/decryption, session management (including key generation), address translation, and/or access control, for example. A proxy is an agent that is situated in a path of communication between a client and a server (e.g., an application server) that can intercept communications (e.g., network packets, frames, datagrams, and messages) between the client and the server. In some examples, functions performed by an application server computer can be offloaded from the application server computer to the intermediary server computer.

The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
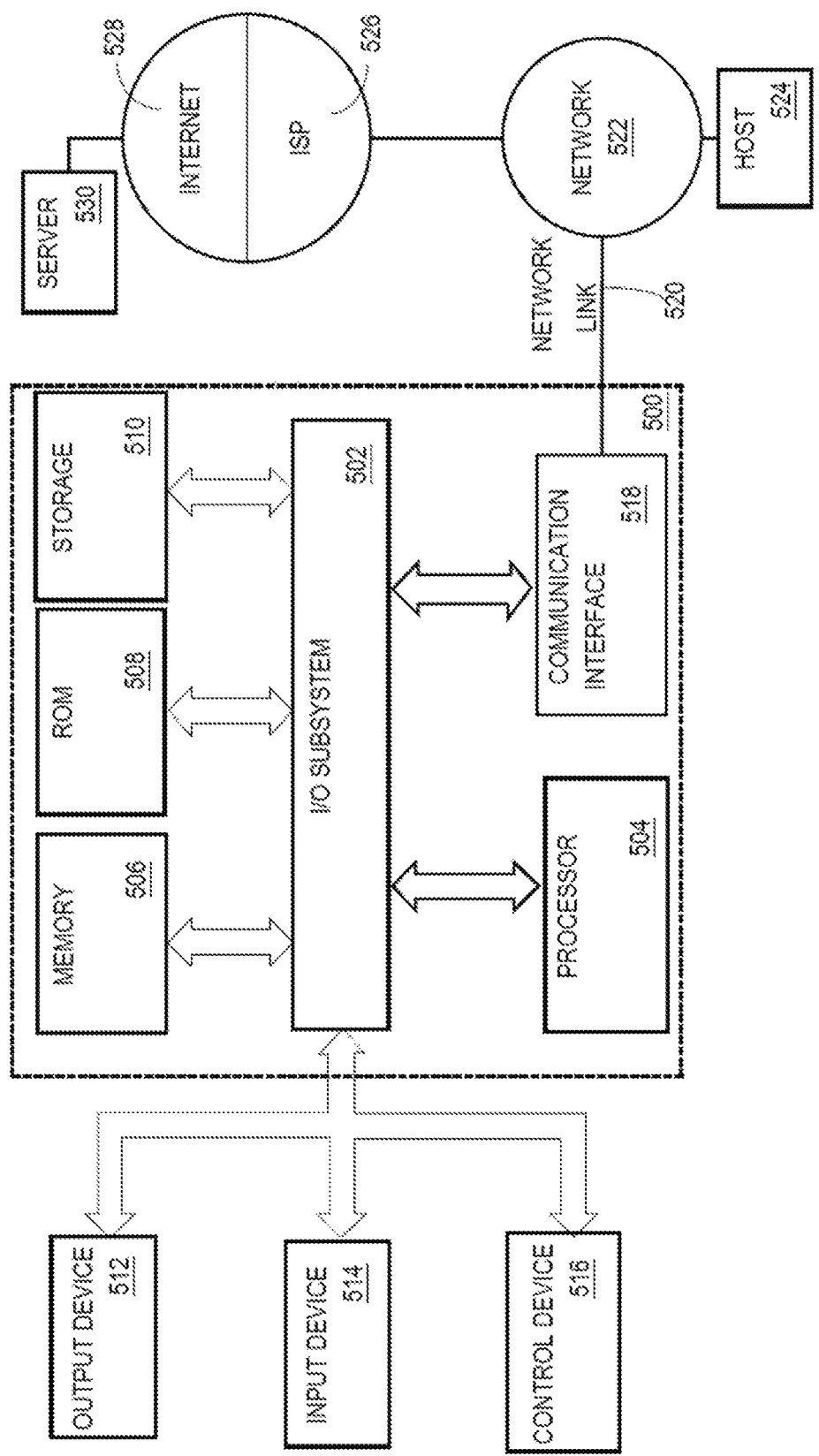
FIG. 5 illustrates an example computer system in which an embodiment may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Figure 6:
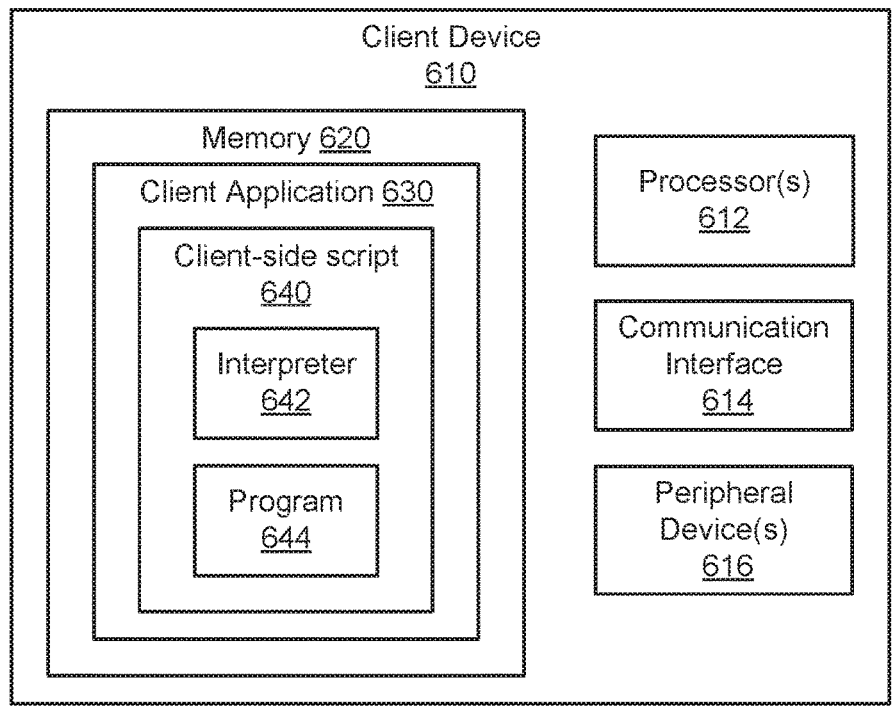
FIG. 6 illustrates an example server computer and an example client computer.
Figure 6:
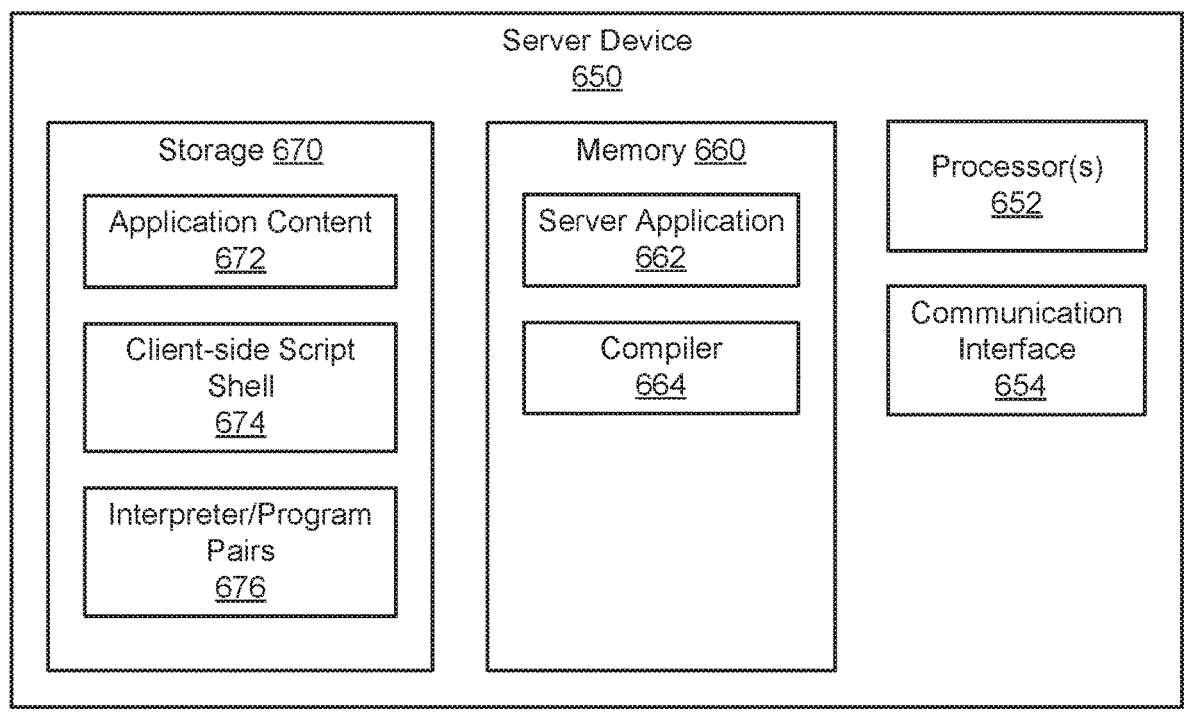

FIG. 6 illustrates an example server computer 650 and an example client computer 610. The client device 610 can include one or more processors 612, a communication interface 614 and one or more peripheral devices 616, and memory 620. The memory 620 can be used to store software applications, such as the client application 630, that are executed by the processor 612. For example, the client application 630 can be used to communicate with a server application over a network. Specifically, the client application 630 can use the communication interface 614 to send and receive network traffic between the client device 610 and the server device. The client application 630 can present a user interface to a user of the client device 610, such as by outputting visual and/or aural information to a peripheral devices 616 (such as a monitor or a speaker). The client application 630 can receive user input, such as a typed or voice command from the peripheral devices 616 (such as a keyboard, a mouse, or microphone). As one example, the client application 630 can be a browser. The client application 630 can send requests for content to a server computer and can receive the content that is sent in response. The content can specify a page to display on the client device 610 and can include programs (e.g., client-side scripts) embedded within the page. As a specific example, the client-side script 640 can execute within a runtime environment of the client application 630. The client-side script 640 can include an interpreter 642 and a program 644 that is targeted to be executed by the interpreter 642. The interpreter 642 and the program 644 can form a pair that together, can execute programs that are specified using a given ISA. The interpreter 642 can include instructions that are execute within the runtime environment of the client application 630. The interpreter 642 can emulate a virtual machine that implements the given ISA. The program 644 can be a set of instructions that comply with the given ISA.

The server device 650 can include one or more processors 652, a communication interface 654, memory 660, and storage 670. The memory 660 can be used to store software applications, such as the server application 662, that are executed by the processor 652. For example, the server application 662 can be used to communicate with a client application over a network. Specifically, the server application 662 can use the communication interface 654 to send and receive network traffic between the client device and the server device 650. As one example, the server application 662 can be a web server. For example, the client can request content for website that is hosted by the server device 650. The requested content can include application content 672 which can include one or more client-side scripts. A client-side script can be implemented using a client-side script shell 674 that can instantiate or reference an interpreter/program pair. For example, the client-side script shell 674 can be used to start the interpreter and load the program into the interpreter when the client-side script is to be executed. A given client-side script can have multiple implementations, where each implementation uses a different interpreter/program pair. The different interpreter/program pairs can use different ISAs. An interpreter/program pair can be generated by the compiler 664. A pair can be generated when a request is received from a client and/or pairs can be pre-generated and stored for future use, such as in the interpreter/program pairs 676. In response to receiving a request for content, the server application 662 can package and return the application content 672, the client-side script shell 674, and a selected pair of the interpreter/program pairs 676. The selected pair can differ depending upon various criteria, such as when a request is received. Accordingly, different request for the same content can be serviced using different interpreter/program pairs that use different ISAs. By using different ISAs, attackers that may be analyzing the client-side script can be slowed or prevented from attacking the server device 650 using information obtained from the content that is sent to the clients.

Example Methods for Obfuscating Programs Using Different ISAs

Figure 7:
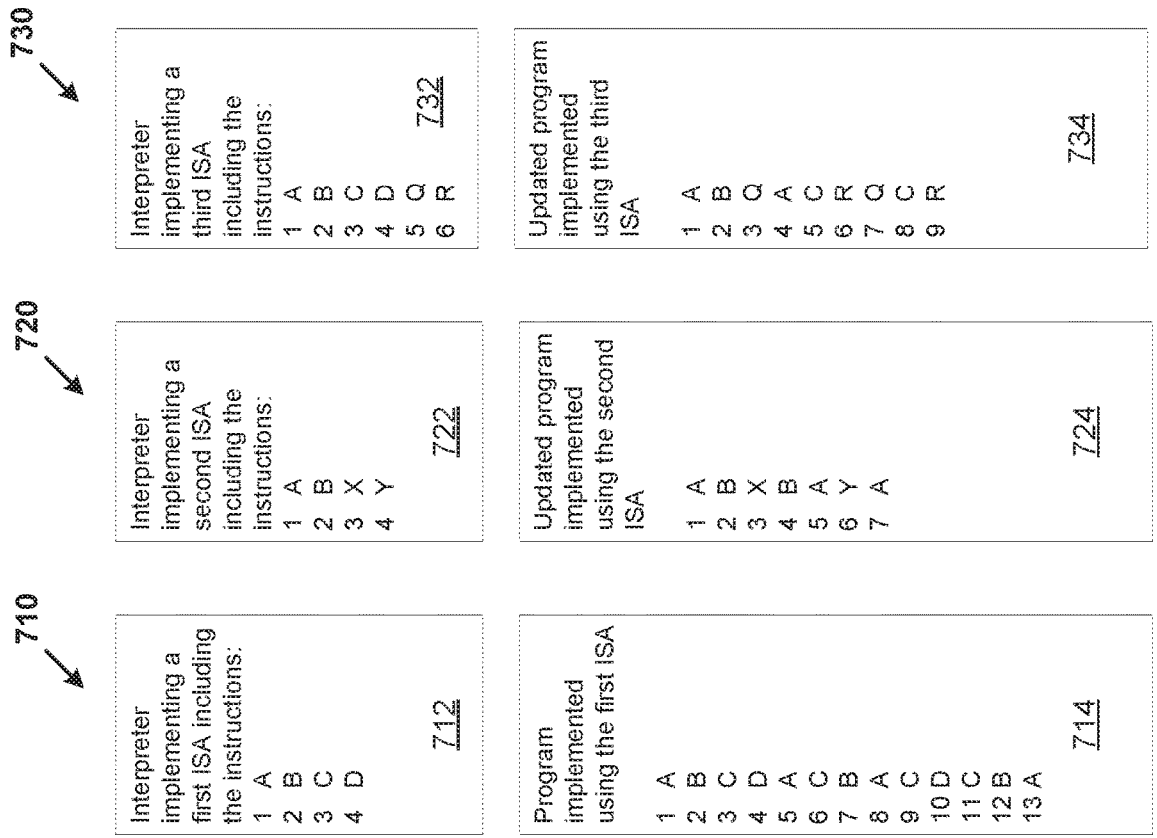
FIG. 7 illustrates an example of obfuscating a program using different instruction set architectures.

FIG. 7 illustrates an example of obfuscating a program using different instruction set architectures. Specifically, FIG. 7 illustrates three different interpreter/program pairs, where each pair is implemented using a different ISA. Each interpreter/program pair can produce an equivalent result as any other interpreter/program pair within the group (710, 720, 730) when the pair is used to execute a client-side script on a client device. However, since each of the interpreter/program pairs uses different instructions, an individual pair will arrive at the result in a different way than the other pairs, which can potentially make it more difficult for a malicious user to determine an equivalence between the different pairs.

The interpreter/program pair 710 includes an interpreter 712 that implements an ISA that includes four different types of instructions (e.g., instruction types A, B, C, and D). For ease of illustration, the instruction types in this example are represented symbolically, without any arguments, in order to show how the instructions can be combined to form new types of instructions. The interpreter 712 can emulate a variety of instruction types. For example, the instruction types can include load and store instructions to memory, read and write instructions to registers, integer and/or floating point arithmetic operations (such as add, subtract, multiply, and divide), logical operations (such as intersection, negation, exclusive-or, bit-wise operations), conditional and unconditional branch operations, and combination instructions that perform multiple operations. The interpreter 712 can emulate a virtual machine that is capable of executing the instruction types of the ISA and so can execute programs (e.g., program 714) that are targeted to that ISA. The program 714 is specified using the instructions of the ISA. As illustrated, the program 714 includes thirteen instructions that are ordered according to how the instructions are stored in memory. The actual control flow of the program 714 may differ from the order that the instructions are stored in memory. For example, if the "D" instruction is a branch instruction, the program may begin execution at line 1, continue execution in a consecutive order to line 4, and then branch to a location other than line 5 (e.g., back to line 1, such as when lines 1-4 form the body of the loop).

The interpreter/program pair 710 can be used to generate interpreter/program pairs 720 and 730 which are capable of producing the same result as the interpreter/program pair 710. Specifically, instructions within the program 714 can be combined to form new instruction types that a part of a different ISA than the ISA of the interpreter/program pair 710. As a first example, the interpreter/program pair 720 can be generated from the interpreter/program pair 710. The subgroup of consecutive instructions (e.g., lines 3-6, comprising instructions CDAC) can be selected from within the set of ordered instructions of the program 714. A new instruction type (e.g., instruction type X) can be generated that performs the operations of the subgroup of consecutive operations (e.g., that generates the same results as the lines 3-6 of program 714, such as by performing the operations of a C instruction followed, by a D instruction, followed by an A instruction, followed by a C instruction). An updated program can be generated by replacing the sequence of CDAC instructions with the X instruction type. When there is more than one instance of the CDAC sequence, the X instruction type may or may not replace the other instances of the CDAC sequence. For example, the other sequences can be randomly selected to be replaced, all of the sequences can be replaced, or only the initially selected sequence can be replaced. The ISA for the updated program can begin as the original ISA of the interpreter 710, and the X instruction type can be added to an ISA for the interpreter 722 to make the new ISA different from the original ISA. Another subgroup of consecutive instructions (e.g., lines 9-12, comprising instructions CDCB) can be selected from within the set of ordered of the program 714. A new instruction type (e.g., instruction type Y) can be generated that performs the operations of the subgroup of consecutive operations (e.g., that generates the same results as the lines 9-12 of program 714, such as by performing the operations of a C instruction, followed by a D instruction, followed by a C instruction, followed by a D instruction). An updated program can be generated by replacing the sequence of CDCB instructions with the Y instruction type. The Y instruction type can be added to an ISA for the interpreter 722. When the sequences of instructions have been selected for the new instruction types, the program 724 can be analyzed to determine if any instruction types are unused and the program 724. These instruction types can be removed from the ISA implemented by the interpreter 722. In this example, all instances of the instruction types C and D were combined into the combination instruction types, and so the instruction types C and D can be removed from the ISA to obtain the final instruction set (A B X Y) for the interpreter 722.

As another example, the interpreter/program pair 730 can be generated from the interpreter/program pair 710. The subgroup of consecutive instructions (e.g., lines 3-4, comprising instructions CD) can be selected from within the set of ordered instructions of the program 714. A new instruction type (e.g., instruction type Q) can be generated that performs the operations of the subgroup of consecutive operations (e.g., that generates the same results as the lines 3-4 of program 714, such as by performing the operations of a C instruction followed by a D instruction). An updated program can be generated by replacing some or all the sequences of CD instructions with the Q instruction type. In this example, the sequence of CD instructions at lines 9-10 are also replaced. The Q instruction type can be added to an ISA for the interpreter 732 to make the new ISA different from the original ISA. Another subgroup of consecutive instructions (e.g., lines 7-8, comprising instructions BA) can be selected from within the set of ordered of the program 714. A new instruction type (e.g., instruction type R) can be generated that performs the operations of the subgroup of consecutive operations (e.g., that generates the same results as the lines 7-8 of program 714, such as by performing the operations of a B instruction followed by an A instruction). An updated program can be generated by replacing some or all of the sequences of BA instructions with the R instruction type. In this example, the sequence of BA instructions at lines 12-13 are also replaced. The R instruction type can be added to an ISA for the interpreter 722. The program 724 can be analyzed to determine if any instruction types are unused and the program 724. In this example, the D instruction type is unused, but this instruction type has been left in the ISA implemented by the interpreter 732 to obtain the final instruction set (A B C D Q R). Leaving unused instructions in the ISA implemented by the interpreter 732 may add to the difficulty of reverse engineering the functionality of the interpreter/program pairs.

Figure 8:
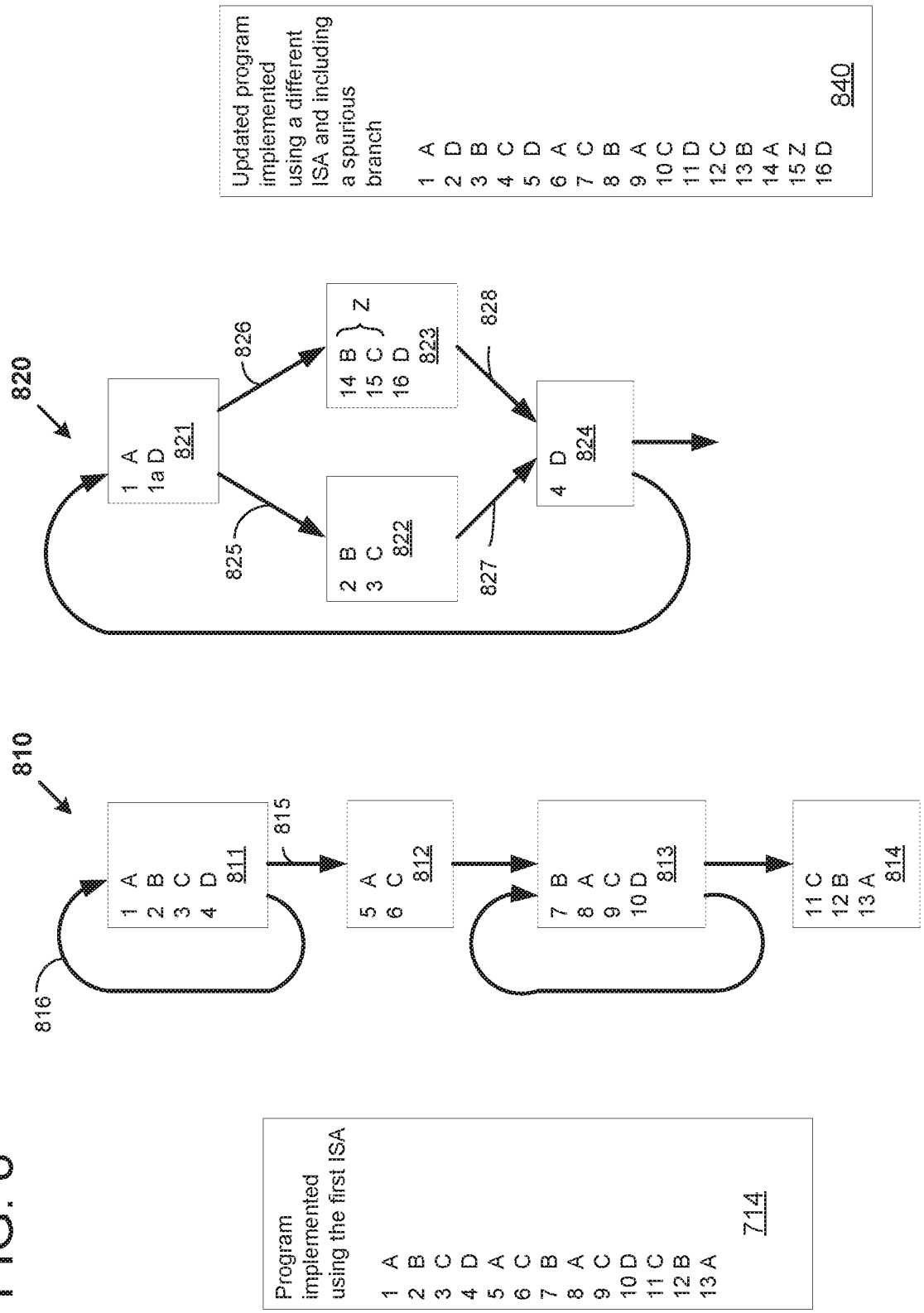
FIG. 8 illustrates an example of adding a spurious branch when obfuscating a program using different instruction set architectures.

FIG. 8 illustrates an example of adding a spurious branch when obfuscating a program using different instruction set architectures. As used herein, a spurious branch is a branch that is added to a program in a location of the program where a branch was not originally present. Adding one or more spurious branches may be advantageous for obfuscating the operation of a program. For example, mapping a control flow of the program can be one step when reverse engineering the functionality of the program and adding new and different branches can potentially make it more difficult to reverse engineer the program. As described above, the order of instructions in a program as it is stored in memory can be different than the execution order of the instructions of the program. Program 714 illustrates the order of instructions as the program is stored in memory. The order of execution can be referred to as the control flow of the program.

Control flow 810 shows an example execution order of the instructions of the program 714. For example, the instructions of the program 714 can be broken up into basic blocks 811-814 where the program executes sequentially within each of the basic blocks. As illustrated, the "D" instruction can be a branch instruction which performs a test of a condition and takes a branch or does not take the branch based on the result of the test. When the branch is not taken, the control flow follows a sequential path (e.g., path 815) and the instruction following the branch instruction is executed. When the branch is taken, the control flow takes a nonsequential path (e.g., path 816) and program execution continues at a location specified by a branch target of the branch. As a specific example, the "D" branch instruction at line 4 in basic block 811 has a branch target of line 1. When a branch is not taken from the "D" branch instruction, the control flow will follow path 815 so that the "A" instruction at line 5 in basic block 812 will be executed after the "D" branch instruction at line 4 in basic block 811. When a branch is taken from the "D" branch instruction, the control flow will follow path 816 so that the "A" instruction at line 1 in basic block 811 will be executed after the "D" branch instruction at line 4 in basic block 811. As another example, the branch target of the branch instruction "D" at line 10 in basic block 813 is the "B" instruction at line 7, and the fall through instruction for the non-taken branch is the "C" instruction at line 11 in basic block 814. While the examples in flow diagram 810 show the branch targets being within the same basic block as of the branch instruction, it will be understood that branch targets can be anywhere within the program.

The control flow 820 illustrates an example of how a spurious branch can be added to the basic block 811 of the control flow 810. Generally, a spurious branch instruction and additional instructions can be added to a program to create parallel paths of execution that generate an equivalent result. An insertion point within the program can be selected to add the spurious branch instruction and to create a spurious branch point. A subgroup of instructions following the insertion point can be selected. The additional instructions can generate an equivalent result as the selected subgroup of instructions. Control flow from the spurious branch point can be randomly selected to flow to either path. When the spurious branch is not taken, the control flow can execute the original instructions of the selected subgroup. Alternatively, when the spurious branch is taken, the control flow can execute the additional instructions that generate the equivalent result as the original instructions of the selected subgroup. In this manner, the result of the program will be same regardless of which path is taken from the spurious branch point. The instructions on either path can be transformed (e.g., instructions can be combined to create new instruction types) so that program may be more difficult to reverse engineer.

As a specific example, the control flow 820 illustrates how the basic block 811 can be transformed using a spurious branch instruction. The spurious branch instruction can be added at line 1a after the "A" instruction at line 1. Adding the branch instruction at line 1a creates a branch point in the control flow 820 where program execution can continue down either path 825 or path 826. The instructions following the insertion point at lines 2-3 can be selected to be the subgroup of instructions that are one of the parallel paths of execution. The additional instructions added for the spurious branch can be added to the end of the program at lines 14-16. For ease of illustration, the additional instructions are initially illustrated as including the identical code sequence from lines 2-3. The instructions at lines 14-15 (the "B" instruction followed by the "C" instruction) can be combined into a "Z" instruction that performs the operations of the "B" and "C" instructions. The additional instructions can include a branch instruction at line 16 to return the parallel path of execution back to the original path of execution. In this manner, the original basic block 811 can be transformed into the flow diagram 820 with basic blocks 821-824. During execution, the spurious branch at line 1a can be randomly selected so the execution follows either path 825 or path 826. After either basic block 822 or 823 are executed, the path of execution can continue to basic block 824 via paths 827 or 828, respectively. Regardless of which execution path is followed, the result of the program will be the same. The updated program 840 includes the example transformations and illustrates how the updated program 840 can be stored in memory, where the additional instructions are added to the end of the original program. Note that the additional instructions include the transformation of the sequential "B" and "C" instructions into the "Z" instruction type (line 15 in program 840) and are renumbered so that the line numbers are integer values. It should be noted that while the subset of instructions following the spurious branch were selected from within a basic block, the subset of instructions can cross basic block boundaries. The ISA for program 840 is different than the ISA for program 714 because program 840 includes a "Z" instruction type that is not found in program 714.

Figure 9:
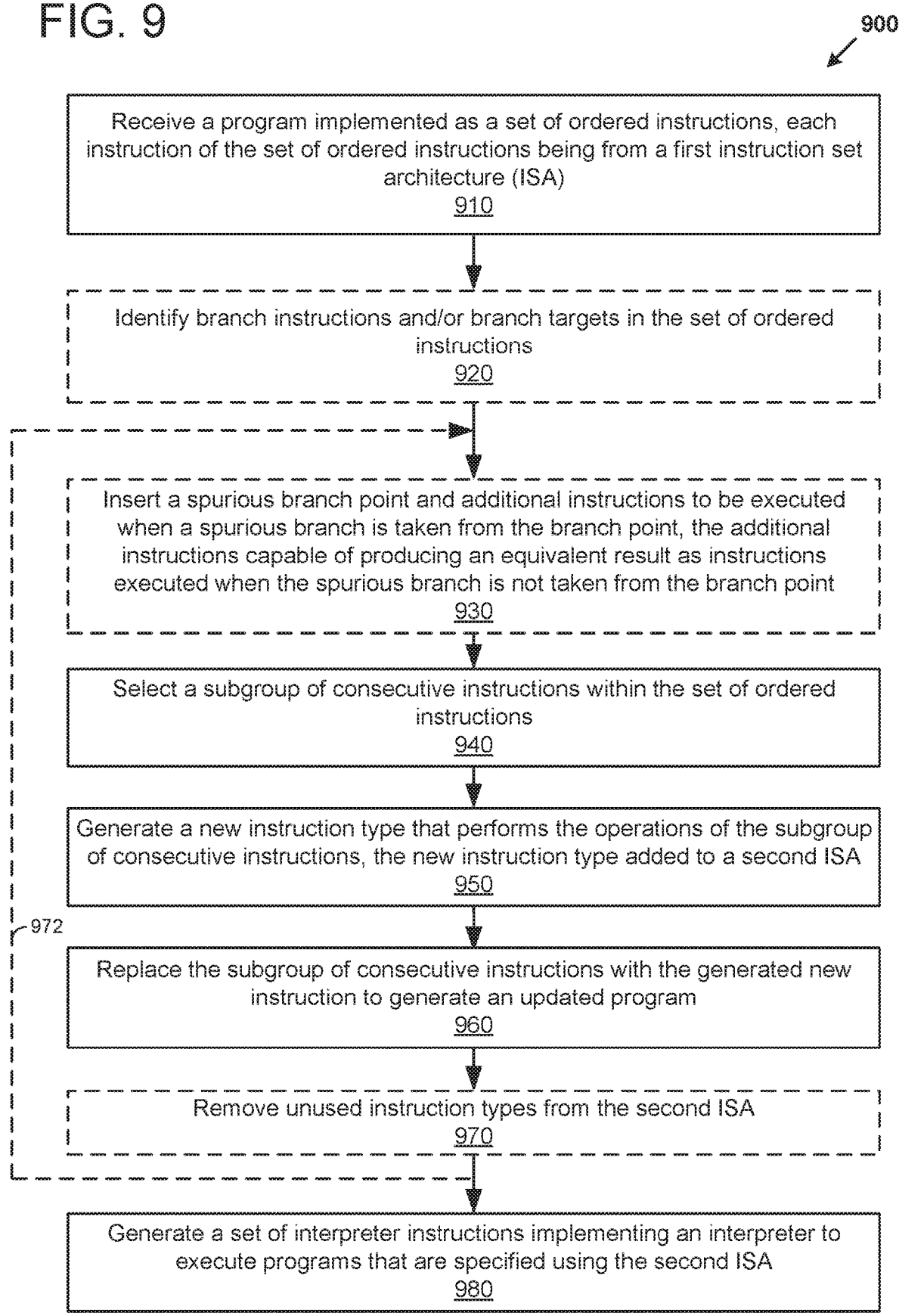
FIG. 9 is a flowchart of an example method for obfuscating a program using different instruction set architectures.

FIG. 9 is a flowchart of an example method 900 for obfuscating a program using different instruction set architectures. For example, a client-server architecture, such as described above with reference to FIGS. 1-8, can be used to obfuscate a program using different instruction set architectures. As one example, the method 900 can be implemented using a server computer, such as described above with reference to FIG. 5. For example, computer-executable instructions for carrying out the method 900 can be stored in computer-readable memory (e.g., the memory 506) and the instructions can be executed by one or more processor(s) (e.g., the processor 504) to perform the method 900.

At 910, a program, implemented as a set of ordered instructions, can be received. For example, the program can be received from a local or remote storage device and/or a local or remote memory. Each instruction of the set of ordered instructions can have an instruction type specified by a first ISA. For example, the instruction types can include load and store instructions to memory, read and write instructions to registers, integer and/or floating point arithmetic operations (such as add, subtract, multiply, and divide), logical operations (such as intersection, negation, exclusive-or, bit-wise operations), conditional and unconditional branch operations, and combination instructions that perform multiple operations. As one example, the program can be a client-side script configured to execute on a runtime environment executing on a client device.

At optional 920, branch instructions and/or branch targets can be identified in the set of ordered instructions of the program. The branch instructions can be conditional or unconditional. A branch target is a nonsequential location (e.g., not directly following the branch instruction) of an instruction for execution to continue at after a branch of the branch instruction is taken.

At optional 930, within the set of ordered instructions of the program, insert a spurious branch point and additional instructions to be executed when a branch is taken from the spurious branch point. During execution, different paths of execution can be taken from the spurious branch point, however any path will produce an equivalent result because the additional instructions are capable of producing an equivalent result as instructions executed when the spurious branch is not taken from the branch point.

At 940, a subgroup of consecutive instructions can be selected from within the set of ordered instructions. As one example, the subgroup of consecutive instructions can be selected randomly or pseudo-randomly from within the set of ordered instructions. As another example, the subgroup of consecutive instructions can include a branch instruction. As another example, the subgroup of consecutive instructions can exclude branch targets from any position, other than the initial position, within the subgroup of consecutive instructions. As another example, the subgroup of consecutive instructions can be selected from an execution path of a spurious branch.

At 950, a new instruction type can be generated that performs the operations of the selected subgroup of consecutive instructions. The new instruction type can be added to a second ISA. By adding the new instruction type to the second ISA, the second ISA is different from the first ISA. The new instruction type may include the same arguments as the each of the instructions of the selected subgroup of consecutive instructions. Additionally or alternatively, the argument list for the new instruction type may be reduced, such as when intermediate operations of the consecutive instructions can be combined or omitted.

The new instruction type may have good obfuscation qualities when the selected subgroup of consecutive instructions includes a branch instruction. For example, the new instruction type can perform a different set of operations depending on whether the branch of the branch instruction is taken or not taken. Specifically, when the branch is taken, the new instruction type will perform the operations of the instructions before the branch instruction and then will perform the branch (e.g., load a program counter with address of the branch target), but it will not perform the operations of the instruction after the branch instruction. However, when the branch is not taken, all of the operations within the selected subgroup of consecutive instructions will be performed, including the instructions that directly follow the branch instruction. Accordingly, the new instruction type may exhibit quite different behavior depending on whether the branch is taken or not taken.

On the other hand, it may be undesirable if the selected subgroup of consecutive instructions for the new instruction type includes a branch target in any position other than the initial position of the subgroup. For example, if program execution after a branch is targeted to the middle of the selected subgroup, then additional overhead may be needed to handle the case where the earlier operations within the subgroup and before the target are not executed when target is branched to. However, a branch target to the beginning of the subgroup does not need additional overhead since there are no operations within the group to perform before the target instruction.

At 960, an updated program can be generated by replacing the selected subgroup of consecutive instructions with a new instruction of the generated new instruction type. As one example, every matching subgroup of consecutive instructions that match the selected subgroup of consecutive instructions can be replaced with the new instruction type. As another example, a portion (e.g., one) of the matching subgroup of consecutive instructions that match the selected subgroup of consecutive instructions can be replaced with the new instruction type.

When a spurious branch point is added (e.g., 930), the selected subgroup can be from one of the execution paths leading from the spurious branch point. By replacing the selected subgroup of consecutive instructions in one branch, but not the other branch, with a new instruction of the generated new instruction type, the diversity of operation can potentially be increased.

At optional 970, any unused instruction types can be removed from the second ISA. For example, the second ISA can initially be a copy of the first ISA. The second ISA will diverge from the first ISA as new instruction types are added to the second ISA. When new subgroups of instructions are combined into the new instructions, instruction types from the first ISA may no longer be used in the updated program. Any unused instruction types can be removed from the second ISA.

The method 900 can optionally repeat 930-970 multiple times, as illustrated by the optional path 972. Repeating 930-970 can potentially cause the first ISA and the second ISA and the initial program and the updated program to diverge by greater amounts, increasing a diversity of the software and potentially making it more difficult for a malicious user to reverse engineer how the program works.

At 980, a set of interpreter instructions implementing an interpreter to execute programs that are specified using instruction types specified by the second ISA can be generated. For example, the interpreter instructions can be specified using a language that can be executed by a runtime environment (e.g., a JavaScript runtime environment) of a client device. The interpreter instructions can read and load the updated program and perform the operations of instructions of the second ISA. For example, the interpreter instructions may emulate a virtual machine that conforms the second ISA.

In this manner, different implementations of the same program, using different ISAs, can be generated. All implementations can generate an equivalent result, e.g., the software visible state of the original program. However, the different implementations can accomplish the functionality of the program in different ways. Specifically, the different implementations can execute instructions from different ISAs that may also follow different control flows (such as when spurious branches are added and when new instruction types implement sequences of instructions with branch instructions within the sequence). The different implementations of the same program can be used to respond to different requests for the program. For example, responding to one request can include sending the program specified in a first ISA and a first interpreter to execute programs specified using the first ISA; and responding to a different request can include sending the program specified in a second ISA and a second interpreter to execute programs specified using the second ISA.

FIG. 10 is a flowchart of an example method 1000 for servicing client requests for a program, where the program is obfuscated by using different instruction set architectures for the program. For example, a client-server architecture, such as described above with reference to FIGS. 1-9, can be used to service client requests for the program. As one example, the method 1000 can be implemented using a server computer, such as described above with reference to FIG. 5. For example, computer-executable instructions for carrying out the method 1000 can be stored in computer-readable memory (e.g., the memory 506) and the instructions can be executed by one or more processor(s) (e.g., the processor 504) to perform the method 1000.

At 1010, an initial interpreter-program code pair can be selected for implementing a client-side script. The interpreter can implement an initial ISA and the program code can be specified using instructions of the initial ISA. As one example, the interpreter can emulate a virtual machine that conforms to the initial ISA and that executes programs specified using the initial ISA. The interpreter can be specified in a language that executes within a runtime environment of a client device.

At 1020, a request for content can be received. The content can include a client-side script that, when executed by a client, generates a result. As one example, the content can include a web page. The web page can include one or more client-side scripts, such as for generating all or a portion of a user interface.

At 1030, a response to the request can be sent. The response can include the client-side script implemented with the selected interpreter-program code pair.

At 1040, it can be determined whether a criterion for changing the ISA has been met. Various criteria can be used. As one example, the ISA can be changed on a periodic basis, such as every 10 seconds, 30 seconds, 1 minute, 10 minutes, 30 minutes, 1 hour, and so forth. Other criteria for changing the ISA can include detecting a request from a different requestor, detecting a request from a different geographic region, detecting a request from a different subnet, detecting an attack of the server computer is underway, and so forth. When the criterion for changing the ISA is not met, the method 1000 can continue at 1020; otherwise the method 1000 can continue at 1050.

At 1050, a different interpreter-program code pair can be selected for implementing the client-side script. The newly selected interpreter can implement a different ISA, and the newly selected program code can be specified using instructions of the different ISA. As one example, the different interpreter-program code pair can be generated on-demand (e.g., in response to determining the criterion for changing the ISA has been met) from the initial interpreter-program code pair, such as by using the method 900 as described with reference to FIG. 9. As another example, the different interpreter-program code pair can be selected from library of interpreter-program code pairs that have been previously generated, such as by using the method 900 as described with reference to FIG. 9. As one example, the methods 900 and 1000 can be used to obfuscate programs by deriving instruction sets from randomized compositions of instructions from a base instruction set.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method for obfuscating programs implemented in cooperation with a network computer system comprising one or more intermediary computers or server computers, the method comprising:

receiving a program implemented as a set of ordered instructions, each instruction of the set of ordered instructions having a type specified by a first instruction set architecture (ISA);

within the set of ordered instructions of the program, inserting a spurious branch point and additional instructions to be executed when a branch is taken from the spurious branch point, wherein the additional instructions are capable of producing an equivalent result as instructions executed when the branch is not taken from the spurious branch point;

selecting a subgroup of consecutive instructions within the set of ordered instructions, wherein the subgroup of consecutive instructions within the set of ordered instructions are selected from only one path of the spurious branch point;

generating a new instruction type that performs the operations of the subgroup of consecutive instructions, the new instruction type added to a second ISA;

generating an updated program by replacing the subgroup of consecutive instructions with a new instruction of the generated new instruction type;

generating a set of interpreter instructions implementing an interpreter to execute programs that are specified using instruction types specified by the second ISA; and in response to a request for the program, sending the updated program and the set of interpreter instructions implementing the interpreter to execute programs that are specified using instruction types specified by the second ISA.

2. The method of claim 1, wherein the program is a client-side script, and the set of interpreter instructions are configured to execute the updated program using a JavaScript runtime environment of a client device.

3. The method of claim 1, further comprising:
identifying branch instructions in the set of ordered instructions of the program, and wherein:
the subgroup of consecutive instructions selected from within the set of ordered instructions includes a branch instruction.

4. The method of claim 1, further comprising:
identifying branch targets in the set of ordered instructions of the program, and wherein:
selecting the subgroup of consecutive instructions within the set of ordered instructions comprises excluding branch targets from any position, other than the initial position, within the subgroup of consecutive instructions.

5. A system comprising one or more intermediary modules, networking modules, or server modules, a memory comprising programmed instructions stored thereon, and one or more processors configured to be capable of executing the stored programmed instructions to:
receive a program implemented as a set of ordered instructions, each instruction of the set of ordered instructions having a type specified by a first instruction set architecture (ISA);
within the set of ordered instructions of the program, insert a spurious branch point and additional instructions to be executed when a branch is taken from the spurious branch point, wherein the additional instructions are capable of producing an equivalent result as instructions executed when the branch is not taken from the spurious branch point;
select a subgroup of consecutive instructions within the set of ordered instructions, wherein the subgroup of consecutive instructions within the set of ordered instructions are selected from only one path of the spurious branch point;
generate a new instruction type that performs the operations of the subgroup of consecutive instructions, the new instruction type added to a second ISA;
generate an updated program by replacing the subgroup of consecutive instructions with a new instruction of the generated new instruction type;
generate a set of interpreter instructions implementing an interpreter to execute programs that are specified using instruction types specified by the second ISA; and
in response to a request for the program, send the updated program and the set of interpreter instructions implementing the interpreter to execute programs that are specified using instruction types specified by the second ISA.

6. The system of claim 5, wherein the program is a client-side script, and the set of interpreter instructions are configured to execute the updated program using a JavaScript runtime environment of a client device.

7. The system of claim 5, further comprising:
identify branch instructions in the set of ordered instructions of the program, and wherein:
the subgroup of consecutive instructions selected from within the set of ordered instructions includes a branch instruction.

8. The system of claim 5, further comprising:
identify branch targets in the set of ordered instructions of the program, and wherein:
selecting the subgroup of consecutive instructions within the set of ordered instructions comprises excluding branch targets from any position, other than the initial position, within the subgroup of consecutive instructions.

9. A non-transitory computer readable medium having stored thereon instructions comprising executable code that, when executed by one or more processors, causes the processors to:
receive a program implemented as a set of ordered instructions, each instruction of the set of ordered instructions having a type specified by a first instruction set architecture (ISA);
within the set of ordered instructions of the program, insert a spurious branch point and additional instructions to be executed when a branch is taken from the spurious branch point, wherein the additional instructions are capable of producing an equivalent result as instructions executed when the branch is not taken from the spurious branch point;
select a subgroup of consecutive instructions within the set of ordered instructions, wherein the subgroup of consecutive instructions within the set of ordered instructions are selected from only one path of the spurious branch point;
generate a new instruction type that performs the operations of the subgroup of consecutive instructions, the new instruction type added to a second ISA;
generate an updated program by replacing the subgroup of consecutive instructions with a new instruction of the generated new instruction type;
generate a set of interpreter instructions implementing an interpreter to execute programs that are specified using instruction types specified by the second ISA; and
in response to a request for the program, send the updated program and the set of interpreter instructions implementing the interpreter to execute programs that are specified using instruction types specified by the second ISA.

10. The non-transitory computer readable medium of claim 9, wherein the program is a client-side script, and the set of interpreter instructions are configured to execute the updated program using a JavaScript runtime environment of a client device.

11. The non-transitory computer readable medium of claim 9, further comprising:
identify branch instructions in the set of ordered instructions of the program, and wherein:
the subgroup of consecutive instructions selected from within the set of ordered instructions includes a branch instruction.

12. The non-transitory computer readable medium of claim 9, further comprising:
identify branch targets in the set of ordered instructions of the program, and wherein:
selecting the subgroup of consecutive instructions within the set of ordered instructions comprises excluding branch targets from any position, other than the initial position, within the subgroup of consecutive instructions.

13. A server computer apparatus, comprising a memory comprising programmed instructions stored thereon and one or more processors configured to be capable of executing the stored programmed instructions to:

receive a program implemented as a set of ordered instructions, each instruction of the set of ordered instructions having a type specified by a first instruction set architecture (ISA);

within the set of ordered instructions of the program, insert a spurious branch point and additional instructions to be executed when a branch is taken from the spurious branch point, wherein the additional instructions are capable of producing an equivalent result as instructions executed when the branch is not taken from the spurious branch point;

select a subgroup of consecutive instructions within the set of ordered instructions, wherein the subgroup of consecutive instructions within the set of ordered instructions are selected from only one path of the spurious branch point;

generate a new instruction type that performs the operations of the subgroup of consecutive instructions, the new instruction type added to a second ISA;

generate an updated program by replacing the subgroup of consecutive instructions with a new instruction of the generated new instruction type;

generate a set of interpreter instructions implementing an interpreter to execute programs that are specified using instruction types specified by the second ISA; and in response to a request for the program, send the updated program and the set of interpreter instructions implementing the interpreter to execute programs that are specified using instruction types specified by the second ISA.

14. The server computer apparatus of claim 13, wherein the program is a client-side script, and the set of interpreter instructions are configured to execute the updated program using a JavaScript runtime environment of a client device.

15. The server computer apparatus of claim 13, further comprising:

identify branch instructions in the set of ordered instructions of the program, and wherein:

the subgroup of consecutive instructions selected from within the set of ordered instructions includes a branch instruction.

16. The server computer apparatus of claim 13, further comprising:

identify branch targets in the set of ordered instructions of the program, and wherein:

selecting the subgroup of consecutive instructions within the set of ordered instructions comprises excluding branch targets from any position, other than the initial position, within the subgroup of consecutive instructions.

* * * * *